United States Patent Office 3,803,145
Patented Apr. 9, 1974

3,803,145
QUINOXALINE-DI-N-OXIDES
Elie Abushanab, East Lyme, Conn., assignor to
Pfizer Inc., New York, N.Y.
No Drawing. Filed Feb. 5, 1970, Ser. No. 9,072
Int. Cl. C07d 51/78
U.S. Cl. 260—250 R                         16 Claims

ABSTRACT OF THE DISCLOSURE 2-substituted-3-sulfinyl- and sulfonyl-quinoxaline-di-N-oxides, prepared from the corresponding 3-thioquinoxaline-di-N-oxides, and their novel conversion to 2-substituted-3-haloquinoxaline-di-N-oxides using aqueous solutions of the appropriate hydrogen halide at temperatures of 25–110° C.

BACKGROUND OF THE INVENTION

This invention relates to a novel series of 2-substituted-3-thio-, sulfinyl- and sulfonylquinoxaline-di-N-oxides possessing antibacterial activity against pathogenic microorganisms and as growth promotants, and the process for conversion of said sulfoxides and sulfones to the corresponding 2-substituted - 3 - haloquinoxaline-di-N-oxides, which also possess chemotherapeutic activity and are useful as intermediates.

Continuing efforts to discover new and more useful antibacterial agents have led to the development of a wide variety of prototype organic compounds including numerous congeners of quinoxaline-di-N-oxides. Landquist et al., J. Chem. Soc. 2052 (1956), in a search for compounds of improved antibacterial or antiprotozoal activity, reported the preparation of several derivatives of 2-methyl- and 2,3-dimethyl-quinoxaline-di-N-oxides in which the methyl groups were converted to groups such as bromomethyl-, acetoxymethyl- and hydroxymethyl. However, no utility is alleged for any of these compounds. French Pat. M3717, granted Jan. 3, 1966, discloses 2-quinoxalinecarboxamide-di-N-oxides in which the carboxamide group may be substituted with an alkyl, substituted alkyl, aryl, cycloalkyl, aralkyl, or cycloalkyl group; or may form a heterocyclic amide, e.g., a piperidide. They are reported to be of use in human therapy as antitubercular, antibacterial, anticancer, antivirus and antiprotozoal agents.

Belgian Pat. 697,976, granted Nov. 3, 1967, describes a variety of N-substituted derivatives of 3-methyl-2-quinoxalinecarboxamide-di-N-oxide in which the N-substituent is phenyl, substituted phenyl, dodecyl or ethyl. Also disclosed are cyclic amides, e.g., pyrrolidide and piperidide. They are said to be of value as intermediates for the preparation of vegetation protection agents and pharmaceutical agents. Belgian Pats. 721,724; 721,725; 721,726; 721,727 and 721,728; published Apr. 2, 1969, describe a variety of N-substituted 3-methyl-2-quinoxalinecarboxamide-di-N-oxide derivatives wherein the N-substituent is a hydroxyalkyl, lower alkoxyalkyl, carboalkoxyalkyl, monoalkylaminoalkyl or di(alkyl)aminoalkyl group as antibacterial agents.

SUMMARY OF THE INVENTION

The novel antibacterial quinoxaline-di-N-oxides of this invention are represented by the Formulae I and II:

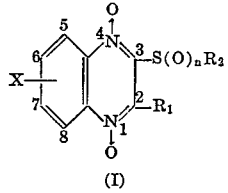
(I)

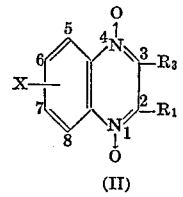
(II)

wherein

X is a substituent at the 6- or 7-position selected from the group consisting of:
  (1) hydrogen,
  (2) fluorine and chlorine,
  (3) methyl, methoxy and trifluoromethyl,
  (4) carboxy, carboalkoxy containing up to 4 carbon atoms and carboxamido of the formula

—CONR$_4$R$_5$ wherein the substituents R$_4$ and R$_5$ are each selected from the group consisting of hydrogen and alkyl containing up to 4 carbon atoms,
  (5) sulfonamido, N-methylsulfonamido and N,N-dimethylsulfonamido;
R$_1$ is selected from the group consisting of:
  (1) hydrogen
  (2) alkyl and α-substituted alkyl containing up to 6 carbon atoms, wherein said α substituent is selected from the group consisting of chlorine, bromine, hydroxy, acetoxy, cyano, carboxamido, carbethoxy and alkylthio, alkylsulfinyl and alkylsulfonyl, said alkyl containing up to 4 carbon atoms,
  (3) phenyl,
  (4) carboxaldehyde,
  (5) carboalkoxy of from 2 to 4 carbon atoms and carboxamido of the formula CONR$_4$R$_5$, wherein the substituents R$_4$ and R$_5$ are each selected from the group consisting of hydrogen and alkyl containing up to 4 carbon atoms,
  (6) alkanoyl containing up to 4 carbon atoms;
R$_2$ is selected from the group consisting of:
  (1) alkyl containing up to 6 carbon atoms,
  (2) cycloalkyl of from 3 to 6 carbon atoms,
  (3) phenyl, benzyl and mono- and disubstituted phenyl and benzyl, said substituents being selected from the group consisting of fluorine, chlorine, bromine, alkyl, alkoxy and alkylthio each containing up to 3 carbon atoms, trifluoromethyl, nitro and trifluoromethoxy;
n is an integer of from 0 to 2; and
R$_3$ is selected from the group consisting of fluorine, chlorine, and bromine;

and the sodium and potassium salts of those compounds wherein R$_1$ is α-carboxyalkyl and X is carboxy.

Of particular interest, because of their high in vitro anti-bacterial activity, are compounds of Formula I wherein X is hydrogen, R$_1$ is methyl, hydroxymethyl or N-methylcarboxamido, R$_2$ is alkyl containing up to 6 carbon atoms and n is an integer of 1 to 2, and of Formula II wherein X is hydrogen or chlorine, R$_1$ is hydroxymethyl or alkyl containing up to 6 carbon atoms and R$_3$ is chlorine or bromine.

The novel process of this invention is for the preparation of quinoxaline-di-N-oxides of the formula:

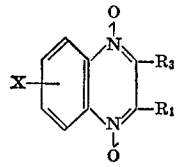

which comprises reaction of a compound of the formula:

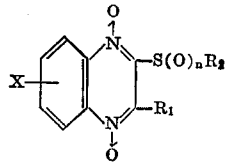

with a hydrogen halide of the formula HA wherein A is an anion selected from the group consisting of fluoride, chloride and bromide.

X is a substituent at the 6- or 7-position selected from the group consisting of:

(1) hydrogen,
(2) fluorine and chlorine,
(3) methyl, methoxy and trifluoromethyl,
(4) carboxy, carboalkoxy containing up to 4 carbon atoms and carboxamido of the formula —$CONR_4R_5$ wherein the substituents $R_4$ and $R_5$ are each selected from the group consisting of hydrogen and alkyl containing up to 4 carbon atoms,
(5) sulfonamido, N-methylsulfonamido and N,N-dimethylsulfonamido;

$R_1$ is selected from the group consisting of:

(1) hydrogen,
(2) alkyl and α-substituted alkyl containing up to 6 carbon atoms, wherein said α substituent is selected from the group consisting of chlorine, bromine, hydroxy, acetoxy, cyano, carboxamido, carbethoxy and alkylthio, and alkylsulfonyl, said alkyl containing up to 4 carbon atoms,
(3) phenyl,
(4) carboxaldehyde,
(5) carboalkoxy of from 2 to 4 carbon atoms and carboxamido of the formula $CONR_4R_5$, wherein the substituents $R_4$ and $R_5$ are each selected from the group consisting of hydrogen and alkyl containing up to 4 carbon atoms,
(6) alkanoyl containing up to 4 carbon atoms,
(7) trifluoromethyl;

$R_2$ is selected from the group consisting of:

(1) alkyl containing up to 6 carbon atoms,
(2) cycloalkyl of from 3 to 6 carbon atoms,
(3) phenyl, benzyl and mono- and disubstituted phenyl and benzyl, said substituent being selected from the group consisting of fluorine chlorine, bromine, alkyl, alkoxy and alkylthio each containing up to 3 carbon atoms, trifluoromethyl, nitro and trifluoromethoxy;

$R_3$ is selected from the group consisting of fluorine, chlorine and bromine; and
$n$ is an integer of 1 or 2, in a reaction-inert solvent at a temperature of from 25–110° C.

By reaction-inert solvent is meant a solvent which, under the conditions of the process, does not enter into any appreciable reaction with either the products or reactants. Both aqueous and non-aqueous solvents can be used. Suitable solvents for the process of this invention include dimethylformamide, dioxane, water, acetone, tetrahydrofuran and hexamethylphosphoramide. Aqueous solvent systems, including those in which an emulsion is formed, e.g., water-water immiscible solvents, can also be used. Solvents which readily form emulsions with water include those water immiscible solvents such as benzene, n-butanol, methylene chloride, chloroform, methyl isobutyl ketone and lower alkyl acetates (e.g., ethyl acetate). The favored solvent, because of convenience and reasons of economy, is water.

The preferred products of said reaction are those of Formula II wherein X is hydrogen or chlorine, $R_1$ is hydroxymethyl or alkyl containing up to 6 carbon atoms and $R_3$ is chlorine or bromine.

DETAILED DESCRIPTION OF THE INVENTION

In accordance with the process employed for preparing the 2-substituted-3-thioquinoxaline-di-N-oxides of the instant invention, an approximately substituted benzofuroxan is contacted with a β-carbonylsulfide, as illustrated in the following scheme.

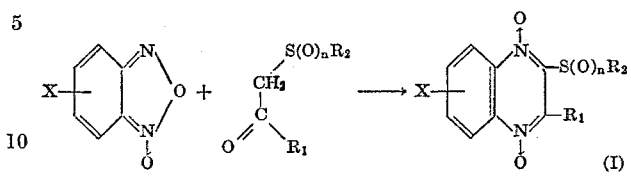

wherein X, $R_1$ and $R_2$ are as previously defined, and $n$ is 0.

As a necessary element of the herein described process, the reaction sequences described above must be effected in the presence of a base. Such a base is of varied character. For instance, it is meant to contemplate such bases as organic amines, ammonia, alkali metal hydroxides, hydrides and alkoxides. Representative of such bases are ammonia, primary amines such as n-propylamine, n-butylamine, aniline, cyclohexylamine, benzylamine, p-toluidine, ethylamine, octylamine; secondary amines such as diethylaniline, N-methylpyrrolidine, N,N-dimethylpyrimidine, N-methylmorpholine, and 1,5-diazobicyclo-[4,3,0]-5-nonene; sodium hydroxide, potassium hydroxide, ammonium hydroxide, sodium ethoxide, potassium methoxide, and sodium hydride. The preferred base to use is an organic amine or ammonia.

In practice, a solution or suspension of the appropriately substituted benzofuroxan and the requisite β-carbonylsulfide in a reaction-inert solvent such as ethanol, N,N-dimethylformamide, benzene, tetrahydrofuran or chloroform is treated with an organic base or ammonia. It is preferable to use at least an equimolar amounts of the benzofuroxan, β-carbonylsulfide and base. The reaction is carried out at ambient temperatures, although it may be heated up to 100° C. to hasten product formation. Reaction time is not critical, but will vary depending on the reactivity of the starting materials, temperature and solvent employed. Substantial yields of the desired products are isolated with reaction periods of 15 minutes to 12 hours.

The requisite benzofuroxans and β-carbonylsulfides are readily available or easily prepared by those skilled in the art. For instance, the synthesis of various substituted benzofuroxans is described by Kaufman et al. in Advan. Heterocyclic Chem., 10, 1 (1969). β-Carbonylsulfides are prepared according to the general procedure of Bradsher et al., J. Am. Chem. Soc., 76, 114 (1954) or as outlined by Reid, "Organic Chemistry of Bivalent Sulfur," vol. II, Chemical Publishing Co., Inc., New York, N.Y. 1960, p. 299.

Quinoxaline - di - N - oxides of the instant invention result from the condensation of benzofuroxan and substituted benzofuroxan with β-carbonylsulfides, such that the 2- and 3-positions of the resulting annellated structure represent the carbonyl carbon and the carbon of the active methylene group of the carbonylsulfide.

The substituents on the benzene moiety of the 2-substituted - 3 - thioquinoxaline-di-N-oxide compounds can vary widely. For example, at least one of the following substituents can be present: hydrogen, alkyl, alkoxy, chloro, fluoro, trifluoromethyl, carboxy, carbamyl, sulfonamido and N-methyl- and N,N-dimethylsulfonamido. The favored positions on the fused benzene ring of said final products are the 6- or 7-positions. The favored positions for substituents on the aryl ring of the starting benzofuroxans leading to said final products are the 5- or 6-positions. When one of said substituted benzofuroxans is condensed with the requisite carbonylsulfide, a 6- and 7-substituted quinoxaline-di-N-oxide are produced. This multiple product formation results because of the two orientation possibilities of the carbonylsulfide fragment in the final product. For example, if one reacts a 5-substituted benzofuroxan of the formula:

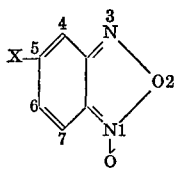

with a reactant $R_1COCH_2SR_2$, two products, a 6- and 7-substituted quinoxaline-di-N-oxide, result as shown by the formulae:

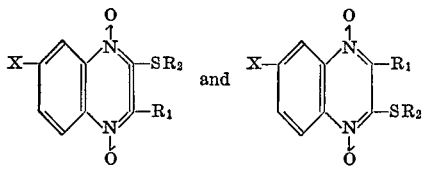

If the corresponding 6-substituted benzofuroxan is employed as the starting material, the same two possible products are formed.

The mixture of isomers is recovered by methods known to those skilled in the art. In many of the preparations disclosed wherein a solid, often crystalline material, separates from the reaction mixture, the solid appears to consist predominantly of one of the isomers. Said isomer can be purified by repeated recrystallization from a suitable solvent to a constant melting point. The other isomer, the one present in smaller amounts in the solid material, is the predominant product in the mother liquor. It can be recovered therefrom by methods known to those skilled in the art, as for example, the evaporation of the mother liquor and repeated crystallization of the residue to a product of constant melting point. Alternatively, the reaction mixture can be extracted either before or after evaporation to dryness.

Although said mixtures may be separated by methods known to those skilled in the art, for practical reasons it is advantageous to use said mixtures, as they are isolated from the reaction. Further, it is frequently advantageous to purify these mixtures of isomers by at least one recrystallization from an appropriate solvent or by trituration in an appropriate solvent. Said recrystalliztion or trituration thus allows the separation of the mixture of positional isomers from such extraneous materials as starting material and undesirable by-products.

The identification of the isomers has not been completed. Both isomers of a given compound, however, exhibit the same type of activity, e.g., as animal groth promotants or as antibacterial agents.

Compounds of the instant invention wherein $R_1$ is carboxamido of the formula $—CONR_4R_5$, wherein said substituents $R_4$ and $R_5$ are each selected from the group consisting of hydrogen and alkyl containing up to 4 carbon atoms are most conveniently prepared from the appropriately substituted benzofuroxan, the requisite thiopyruvate ester and amine, $HNR_4R_5$, using the aforementioned reaction conditions. Formation of the corresponding ester is not detected.

3-substitutedthioquinoxaline-di-N-oxides of the present invention having an alkyl substituent at the 2-position, in addition to being chemotherapeutic agents, are also useful as intermediates in the preparation of other antimicrobial quinoxaline-di-N-oxides.

Functionalization of the 2-alkyl substituent is carried out by halogenation with molecular bromine or chlorine. In practice, a solution of the quinoxaline-di-N-oxides in a reaction-inert solvent such as chloroform, methylene chloride or tetrahydrofuran are treated with at least an equimolar amount of the halogenating agent, molecular bromine or chlorine. The reaction is carried out at temperatures of from about 40–100° C. for a reaction time of about 2–8 hours. The reaction period is not critical, and is dependent on the reaction temperature and the reactivity of the reactants. A convenient means of isolation is to concentrate the reaction mixture to a small volume and cool sufficiently to cause the product to precipitate. After the crude product has been filtered, the filtrate is further extracted with an appropriate solvent such as chloroform, and the chloroform evaporated to dryness. The residue is combined with the filtered solid and recrystallized from a suitable solvent.

The aforementioned reaction is a convenient method for the preparation and isolation of 2-($\alpha$-haloalkyl) congeners in this series wherein the halogen is bromine or chlorine. Further, the resulting $\alpha$-haloalkyl analogs serve as the starting material for nucleophilic displacement reactions involving replacement of the $\alpha$-halo moiety by a number of other functional groups.

For instance, the 2 - ($\alpha$ - haloalkyl)-3-substitutedthioquinoxaline-di-N-oxides are treated with the sliver salt of a carboxylic acid in a reaction-inert solvent such as dimethylformamide or hexamethylphosphoramide. At least an equimolar amount of silver salt is employed, although an excess of 10–20% will shorten the reaction time without affecting the course of the reaction. Said reaction period requires from about 2–10 hours at temperatures of from about 50–100° C. The resulting 2-($\alpha$-acyloxyalkyl) compounds are conveniently isolated by pouring the reaction mixture into water and extracting with an appropriate solvent such as chloroform.

Hydrolysis of the aforementioned 2-($\alpha$-acyloxyalkyl) analogs to the corresponding 2-($\alpha$-hydroxyalkyl) compounds is effected by treating said 2-($\alpha$-acyloxyalkyl)-3-substitutedthioquinoxaline-di-N-oxide with hydrochloric acid in a suitable solvent such as methanol-water or ethanol-water. In general, the concentration of acid is from about 3–9 N, with a preferred range of 5–7 N. It is preferable that the reaction be heated from 50° C. to the reflux temperature for a period of from 1–7 hours. After the reaction is completed, it is cooled and extracted several times with a suitable solvent such as chloroform or methylene chloride.

Further functionalization of the 2-alkyl portion of the quinoxaline-di-N-oxides of Formula I is carried out by reaction of the aforementioned 2-($\alpha$-haloalkyl) compounds with alkali metal salts of hydrocyanic acid (HCN). In practice, a solution of the 2-($\alpha$-haloalkyl) congener in a reaction-inert solvent such as dimethylformamide, ethanol or hexamethylphosphoramide is treated with at least an equimolar amount of lithium cyanide, and preferably a 100–200% excess of said reagent dissolved in a minimum amount of water. It is preferred that the reaction be heated from about 60–100° C. for 1–6 hours. Reaction time is not critical, longer reaction periods being required when lower temperatures are employed. The product is conveniently isolated by pouring the reaction mixture into ice and water, followed by suction filtration of the precipitated 2-($\alpha$-cyanoalkyl)-3-substitutedthioquinoxaline-di-N-oxides.

2 - ($\alpha$ - carboxyalkyl)-3-substitutedthioquinoxaline-di-N-oxides are synthesized from the aforesaid cyano compounds via hydrolysis, which constitutes heating said nitriles from 50–100° C. in a 4–8 N solution of an acid, e.g., hydrochloric or sulfuric acid, for a period of 4–8 hours or until thin layer chromatography samples of the reaction mixture indicate the hydrolysis is complete. Since the starting nitriles and resulting acids have limited solubility in water it is advantageous that the reaction solvent contain from 25–50% methanol or ethanol. A suitable workup consists of dilution of the cooled reaction mixture with water, and extraction with a convenient solvent, such as ethyl acetate or chloroform, of the desired product.

Products of the instant invention also include the esters and amides of the aforesaid 2-($\alpha$-carboxyalkyl) compounds. Esters thereof are prepared by a conventional method, which consists of treating a solution of the corresponding 2-(α-carboxyalkyl)-3-substitutedthioquinoxaline-di-N-oxides in the appropriate alcohol with gaseous hydrogen chloride. After the solution has been saturated with said gas it is heated from 50° C. to reflux temperature for a period of 30 minutes to 2 hours. Removal of excess solvent provides the desired esters.

Amides of the corresponding acids are most conveniently synthesized utilizing a mixed anhydride method known to those skilled in the art, cf., Fieser and Fieser, "Reagents for Organic Synthesis," John Wiley and Sons, Inc., New York, N.Y. (1967), p. 364. In practice, a solution of the appropriate 2-(α-carboxyalkyl)-3-substituted-thioquinoxaline-di-N-oxides in a reaction-inert solvent such as chloroform, methylene chloride or hexachloroethane are treated with an equimolar amount of ethyl chloroformate and the resulting solution cooled to 0° C. An equimolar quantity of a tri(lower)-alkyl amine, e.g., triethyl amine, is added, preferably dropwise, to the cooled reaction mixture. After allowing the reaction to remain at 0° C. for from 10-60 minutes, it is treated with an equimolar amount, and preferably a 10-20% excess, of ammonia or the amine from which the amide is derived. In general, the amine is added slowly to avoid raising the reaction temperature above 0-5° C. When the addition is complete, the mixture is allowed to warm to room temperature and may subsequently be heated to 50-80° C. to hasten the reaction. The reaction period, depending on the temperature employed, may be from about 1-24 hours, shorter times being required with higher reaction temperatures. The product is isolated from the solvent layer after said solvent has been washed with water and evaporated to dryness.

Oxidation of all the aforemention 3-substitutedthioquinoxaline-di-N-oxides to the corresponding sulfoxides and sulfones is carried out using an appropriate oxidizing agent. The oxidizing agent of choice is m-chloroperbenzoic acid. Accordingly, a solution of the appropriate sulfides in a reaction-inert solvent, e.g., chloroform or methylene chloride, is treated, in the case of sulfoxide formation, with an equimolar amounts of m-chloroperbenzoic acid, dissolved in the same solvent. The reaction is usually carried out at 0-50° C. for a period of 3-24 hours, depending on the reactivity of the sulfide reactant. A convenient workup procedure consists of washing the reaction mixture with sodium bicarbonate solution followed by drying and removal of the reaction solvent.

The aforesaid procedure is also employed for the preparation of the corresponding sulfones except two moles of said oxidizing agent is used for each mole of sulfide reactant. The reaction condition and isolation of the product are the same for both oxidation processes.

Compounds of the present invention of Formula I

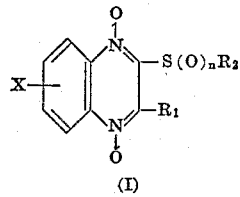

(I)

wherein $R_1$ is carboxaldehyde and alkanoyl containing up to 4 carbon atoms and $R_2$, $n$, and X are as previously defined, are synthesized by the reaction which comprises oxidation of the corresponding 2-(α-hydroxyalkyl) analogs to said carbonyl compounds. The selective oxidation reaction leading to aforesaid aldehydes and ketones is known to those skilled in the art as taught by Pfitzner and Moffatt, J. Am. Chem. Soc., 87, 5661, 5670 (1965).

In practice, said compounds are prepared by addition of three moles of dicyclohexylcarbodiimide to a dry dimethylsulfoxide solution of 1 mole of the requisite 2-(α-hydroxyalkyl) compound and one and one-half moles of an acid such as phosphoric acid. The reaction period requires from 1-6 hours at temperatures of from about 20-50° C. The product is isolated from the reaction mixture by diluting with water, and extracting the mixture with an appropriate solvent such as chloroform or methylene chloride followed by removal of the solvent under reduced pressure. The crude product is further purified by recrystallization from methanol or ethanol.

Mild oxidation of those compounds wherein $R_1$ is carboxaldehyde results in the preparation of the corresponding acids. In practice, one mole of the appropriate aldehyde is added slowly to an acetone solution containing one mole of chromic acid (Jones Reagent), cf., Djerassi, et al., J. Org. Chem., 45, 28 (1965). The mixture is allowed to stir 3-6 hours at temperatures of 20-30° C. A satisfactory workup procedure consists of diluting the reaction with sufficient water to preciptate the resulting acid, followed by extraction of the product with a suitable solvent.

Esters of the present invention wherein $R_1$ is carboalkoxy of from 2 to 4 carbon atoms are synthesized from the aforementioned acids by a conventional method, which comprises treating a solution of the corresponding 2-carboxy-3-substituted thioquinoxaline-di-N-oxide in the appropriate alcohol with gaseous hydrogen chloride. After the reaction mixture has been saturated with said gas it is heated from 30-80° C. for a period of 15 minutes to 2 hours. Removal of the excess hydrogen chloride gas and solvent provides the desired ester.

Compounds of Formula I wherein $R_1$ is

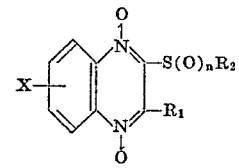

α-haloalkyl and $R_2$, $n$, and X are as previously defined, are further functionalized through reactions with mercaptans, thus providing compounds of Formula I wherein $R_1$ is α-alkylthioalkyl. In practice, a solution of the salt, e.g., sodium salt, of the mercaptan, prepared in situ using an equimolar amount of sodium hydride and said mercaptan, in a reaction-inert solvent, such as dimethylformamide, dimethylsulfoxide, or hexamethylphosphoramide, is treated with approximately an equimolar amount of the appropriate 2-(α-haloalkyl) quinoxaline-di-N-oxide. It is advantageous to maintain an atmosphere of an inert gas such as nitrogen in such reactions to reduce air oxidation of the mercaptan reactant. The reaction temperatures and times are not critical. In general, temperatures of from 25-75° C. and times of 1-8 hours are adequate. The products are isolated by diluting the reaction mixture with water and extracting with a solvent such as chloroform. Removal of the solvent provides the products. Purification is carried by recrystallization from suitable solvents.

Oxidation of these 2-(α-alkylthioalkyl) quinoxaline-di-N-oxides is achieved by the same procedure utilized for oxidation of the 3-thio congeners. Accordingly, a solution of the requisite 2-(α-alkylthioalkyl)-3-substituted-thio-, sulfinyl- or sulfonylquinoxaline-di-N-oxide in a reation-inert solvent, e.g., chloroform or methylene chloride, is treated, in the case of sulfoxide preparation, with an equimolar amount of m-chloroperbenzoic acid dissolved in the same solvent. After the addition, which is preferably dropwise, the reaction mixture is allowed to remain at room temperature overnight. Alternately, the reaction may be hastened by warming from about 35-50° C. for a shorter reaction period, usually about 1-3 hours. The solvent layer is washed several times with a sodium bicarbonate solution, dried and removed in vacuo to provide the crude oxidation product.

Sulfone formation is achieved under the same conditions utilizing two moles of m-chloroperbenzoic acid per mole of substrate to be oxidized.

When a sulfide structure exists in both the 2- and 3-positional substituents, oxidation preferentially takes place on the more nucleophilic sulfur of the 2-substituent.

As previously indicated, the quinoxaline-di-N-oxides of the present invention are all readily adapted to therapeutic use as antibacterial agents and as growth promotants. Typical member compounds of interest in this series include 2-methyl-3-methylsulfinylquinoxaline-di-N-oxide,
2-methyl-3-methylsulfonylquinoxaline-di-N-oxide,
2-hydroxymethyl-3-methylsulfinylquinoxaline-di-N-oxide,
2-hydroxymethyl-3-methylsulfonylquinoxaline-di-N-oxide,
2-(N-methylcarboxamido)-3-methylsulfinylquinoxaline-di-N-oxide and
2-(N-methylcarboxamido)-3-methylsulfonylquinoxaline-di-N-oxide.

Further, certain members of said series, namely, 3-substituted sulfinyl- and -sulfonylquinoxaline-di-N-oxides, are also useful as intermediates in the preparation of 3-haloquinoxaline-di-N-oxides, a class of analogs also possessing chemotherapeutic activity and valuable as intermediates.

The novel process of this invention, as previously mentioned, comprises treating the sulfinyl and sulfonyl derivatives of the present invention with a concentrated acid such as hydrogen chloride, hydrogen bromide or hydrogen fluoride.

Said reaction may be carried out over a wide temperature range of from about 25° C. to about 100° C. The particular temperature chosen is a function of the concentration of the acid employed and the reactivity of the reactants. In general, higher acid concentrations facilitate the rearrangement and permit the reaction to proceed at lower temperatures. Further, the use of sulfonyl derivatives as opposed to the sulfinyl also allows said process to be conducted at lower temperatures. In practice, the preferred temperature range is from 50° C. to about 90° C.

Reaction time, naturally, will vary considerably, depending on temperature, concentration of reactants and their respective reactivities. Product formation is rapid when elevated temperatures, concentrated acids or sulfonly derivatives are employed. Reaction times can vary from five minutes to one hour, with a preferred time of 10–30 minutes.

The concentration of hydrogen halide employed in this process with respect to the quinoxaline-di-N-oxide influences, to a marked degree, reaction time. For practical purposes, it is desirable to have at least an equimolar amount of said acid present. However, since rapid product formation is desirable, it is advantageous to use ratios of acid, with a preferred 3–10 molar excess of the hydrogen halide.

The order of combination of the reactants of said process is not critical. Practically, the sulfinyl or sulfonyl derivatives are added to a solution of the requisite hydrogen halide in an appropriate inert solvent. As has been previously indicated, said inert solvents can be aqueous or non-aqueous and include those which form emulsions with water.

Commercially available aqueous solutions of the hydrogen halides serve adequately as a source of said reactant when an aqueous solvent is employed. Appropriate dilutions can accurately be made using methods known to those skilled in the art when solutions less concentrated than those readily available are desired.

Non-aqueous solutions are readily prepared by adding desired quantities of the anhydrous hydrogen halide to the appropriate non-aqueous solvent until the desired concentration is achieved. Accurate determination of concentration may be made using titration techniques familiar to those skilled in the art.

Recovery of the desired therapeutic products produced by the process of the present invention is then carried out in accordance with standard, conventional procedures. For example, when an aqueous solvent is employed such methods as cooling and filtering or concentration of said reaction in vacuo followed by cooling and filtering are adequate. Additional material can be obtained by further extraction of the filtrate with a suitable solvent such as methylene chloride.

When non-aqueous solvents are used in said process the products are conveniently isolated after the reaction mixture has been washed several times with water to remove excess hydrogen halide. Solvents used therein are then separated, dried over a suitable drying agent, e.g., anhydrous sodium sulfate, and concentrated under reduced pressure to dryness.

Products of this novel process which are of particular interest because of their high in vitro antibacterial activity are 2-methyl-3-chloroquinoxaline-di-N-oxide, 2-methyl-3-bromoquinoxaline-di-N-oxide, 2-methyl-3,6- and 7-dichloroquinoxaline-di-N-oxide and 2-methyl-3-bromo-6- and 7-chloroquinoxaline-di-N-oxide.

The valuable products of this invention are remarkably effective in treating a wide variety of pathogenic microorganisms. They are, therefore, useful as industrial antimicrobials, for example, in water treatment, slime-control, paint preservation and wood preservation as well as for topical application purposes as disinfectants.

For in vitro use, e.g., for topical application, it will often be convenient to compound the selected product with a pharmaceutically-acceptable carrier such as vegetable or mineral oil or an emollient cream. Similarly, they may be dissolved or dispersed in liquid carriers or solvents such as water, alcohol, glycols or mixtures thereof or other pharmaceutically acceptable inert media, that is, media which have no harmful effect on the active ingredient. For such purposes, it will generally be acceptable to employ concentrations of active ingredients of from about 0.01 percent to about 10 percent by weight based on total composition.

In vitro data for several compounds of this invention against *Staphylococcus aureus* and *Escherechia coli* are presented below. The tests are run under standardized conditions in which nutrient broth containing various concentrations of the test material was seeded with the particular organisms specified, and the minimum concentration (MIC) at which growth of each organism failed to occur was observed and recorded. Benzylpenicillin (K salt) when thus tested gave values of 0.156 and >100 vs. *S. aureus* and *E. coli*, respectively.

In vitro Data vs. *S. aureus* and *E. coli*

| X | $R_1$ | $R_2$ | $R_3$ | $n$ | S. aureus | E. coli |
|---|---|---|---|---|---|---|
| H | $CH_2Br$ | $CH_3$ | | 0 | 100 | 6.25 |
| H | $CH_2Br$ | $CH_3$ | | 1 | | 1.56 |
| Cl | $CH_3$ | $CH_3$ | | 1 | 50 | 0.78 |
| Cl | $CH_3$ | $CH_3$ | | 2 | | 0.78 |
| H | $CH_3$ | $CH_3$ | | 1 | 12.5 | 0.78 |
| H | $CH_3$ | $CH_3$ | | 2 | 25 | 0.39 |
| H | $CH_3$ | | Cl | | | 6.25 |

Further, compounds described herein exhibit broad spectrum activity, that is, activity against both gram-negative and gram-positive bacteria, in contrast to the usual gram-negative activity of quinoxaline-di-N-oxides. Additionally, several of them are active in vivo and are especially useful as animal growth promotants, especially for swine and poultry.

When used in vivo for such purposes, these novel compounds can be administered orally or parenterally, e.g., by subcutaneous or intramuscular injection, at a dosage of from about 1 mg./kg. to about 100 mg./kg. of body weight. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame), dimethylsulfoxide and other non-aqueous vehicles which will not interfere with therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, hyaluronidase, local anesthetics and inorganic salts to afford desirable pharmacological properties. These compounds may also be combined with various pharmaceutically-acceptable inert carriers including solid diluents, aqueous vehicles, non-toxic organic solvents in the form of capsules, tablets, lozenges, troches, dry mixes, suspensions, solutions, elixirs and parenteral solutions or suspensions. In general, the compounds are used in various dosage forms at concentration levels ranging from about 0.5 percent to about 90 percent by weight of the total composition.

Other methods include mixing with animal feeds, the preparation of feed concentrates and supplements and dilute solutions or suspensions, e.g., a 0.1 percent solution, for drinking purposes. The addition of a low level of one or more of the herein described quinoxaline-di-N-oxides (Formulae I and II) to the diet of healthy animals, both ruminant and non-ruminant, such that these animals receive the product over an extended period of time, at a level of from about 1 mg./kg. to about 100 mg./kg. of body weight per day, especially over a major portion of their active growth period, results in an acceleration of the rate of growth and improves feed efficiency (the number of pounds of feed required to produce a pound gain in weight). Included in these two classes of animals are poultry (chickens, ducks, turkeys), cattle, sheep, dogs, cats, swine, rats, mice, horses, goats, mules, rabbits, mink, etc. The beneficial effects in growth rate and feed efficiency are over and above what is normally obtained with complete nutritious diets containing all the nutrients, vitamins, minerals, and other factors known to be required for the maximum healthy growth of such animals. The animals thus attain market size sooner and on less feed.

The herein described feed compositions have been found to be particularly valuable and outstanding in the case of swine. In some instances the degree of response may vary with respect to the sex of the animals. The products may, of course, be administered in one component of the feed or they may be blended uniformly throughout a mixed feed; alternatively as noted above, they may be administered in an equivalent amount via the animal's water ration. It should be noted that a variety of feed components may be of use in the nutritionally balanced feeds. Any animal feed composition may be prepared to comprise the usual nutritional balance of energy, proteins, minerals and vitamins together with one or more of the quinoxaline-di-N-oxides described above. Some of the various components are commonly grains such as ground grain and grain by-products; animal protein substances, such as meat and fish by-products; vitaminaceous mixtures, e.g., vitamin A and D mixtures, riboflavin supplements and other vitamin B complexes; and bone meal limestone and other inorganic compounds to provide minerals.

The relative proportions of the present compounds in feeds and feed concentrates may vary somewhat, depending upon the compound, the feed with which they are employed and the animal consuming the same. These substances are advantageously combined in such relative proportions with edible carriers as to provide pre-mixes or concentrates which may readily be blended with standard nutritionally balanced feeds or which may be used themselves as an adjunct to normal feedings.

In the preparation of concentrates a wide variety of carriers, including the following: soybean oil meal, corn gluten meal, cotton seed oil meal, sunflower seed meal, linseed oil meal, cornmeal, limestone and corncob meal can be employed. The carrier facilitates uniform distribution of the active materials in the finished feed with which the concentrate is blended. The concentrate may be surface coated, if desired, with various proteinaceous materials or edible waxes, such as zein, gelatin, microcrystalline wax and the like to provide a protective film which seals in the active ingredients. It will be appreciated that the proportions of the drug preparation in such concentrates are capable of wide variation since the amount of active materials in the finished feed may be adjusted by blending the appropriate proportion of concentrate with the feed to obtain the desired degree of supplementation. In the preparation of high potency concentrates, i.e., premixes, suitable for blending by feed manufacturers to produce finished feeds or concentrates of lower potency, the drug content may range from about 0.1 g. to 50 g. per pound of concentrate. The high potency concentrates may be blended by the feed manufacturer with proteinaceous carriers, such as soybean oil meal, to produce concentrated supplements which are suitable for direct feeding to animals. The proportion of the drug in these supplements may vary from about 0.1 to 10 g. per pound of supplement. A particularly useful concentrate is provided by blending 2 g. of drug with 1 pound of limestone or 1 pound of limestone-soybean oil meal (1:1). Other dietary supplements, such as vitamins, minerals, etc., may be added to the concentrates in the appropriate circumstances.

The concentrates described may also be added to animal feeds to produce a nutritionally balanced, finished feed containing from about 5 to about 125 g. of the herein described compounds per ton of finished feed. In the case of ruminants, the finished feed should contain protein, fat, fiber, carbohydrate, vitamins and minerals, each in an amount sufficient to meet the nutritional requirements of the animal for which the feed is intended. Most of these substances are present in naturally occurring feed materials, such as alfalfa hay or meal, cracked corn, whole oats, soybean oil meal, corn silage, ground corn cobs, wheat bran and dried molasses. Bone meal, limestone, iodized salt and trace minerals are frequently added to supply the necessary minerals and urea to provide additional nitrogen.

As is well-known to those skilled in the art, the types of diets are extremely variable depending upon the purpose, type of feeding operation, species, etc. Specific diets for various purposes are listed by Morrison in the Appendix of "Feeds and Feeding," the Morrison Publishing Company, Clinton, Iowa, 1959.

In the case of non-ruminant animals, such as hogs, a suitable feed may contain from about 50 to 80 percent of grains, 3 to 10 percent animals protein, 5 to 30 percent vegetable protein, 2 to 4 percent of minerals, together with supplementary vitaminaceous sources.

The following examples are given solely for the purpose of illustration.

EXAMPLE I 2-methyl-3-methylthioquinoxaline-di-N-oxide

To a solution of 10.4 g. (0.1 mole) of methylacetonylsulfide in 200 ml. of methanol is added 13.6 g. (0.1 mole) of benzofuroxan. Ammonia gas is bubbled into the reaction mixture for 15 min., after which the reaction is allowed to remain at room temperature for several hours. The resulting precipitate is suction filtered, dried and recrystallized from methanol to provide the desired product, M.P. 146–148° C.

Analysis.—Calcd. for $C_{10}H_{10}O_2N_2S$ (percent): C, 54.01; H, 4.50; N, 12.61. Found (percent): C, 53.80; H, 4.52; N, 12.49.

EXAMPLE II

Th procedure of Example I is repeated, using equivalent amounts of the appropriate starting materials, to produce the following compounds:

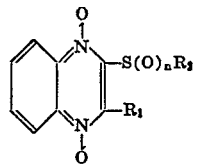

| $R_1$ | $n$ | $R_2$ |
|---|---|---|
| $CH_3$ | 0 | $CH_2CH_3$ |
| $CH_3$ | 0 | $CH_2CH_2CH_3$ |
| $CH_3$ | 0 | $CH(CH_3)_2$ |
| $CH_3$ | 0 | $(CH_2)_3CH_3$ |
| $CH_3$ | 0 | $CH(CH_3)CH_2CH_3$ |
| $CH_3$ | 0 | $C(CH_3)_3$ |
| $CH_2CH_3$ | 0 | $(CH_2)_4CH_3$ |
| $CH_2CH_3$ | 0 | $CH_2CH_3$ |
| $CH_2CH_3$ | 0 | $C(CH_3)_2(CH_2)_2CH_3$ |
| $CH_2CH_3$ | 0 | $CH(CH_3)_2$ |
| $CH_2CH_3$ | 0 | Cyclopropyl |
| $CH_3$ | 0 | Cyclopentyl |
| $CH(CH_3)_2$ | 0 | $CH(CH_3)CH(CH_3)_2$ |
| $(CH_2)_2CH_3$ | 0 | Cyclohexyl |
| $CH(CH_3)_2$ | 0 | Cyclohexyl |
| $CH(CH_3)CH_2CH_3$ | 0 | $C_2H_5$ |
| $(CH_2)_5CH_3$ | 0 | Cyclobutyl |
| $C_6H_5$ | 0 | Cyclopropyl |
| $C_6H_5$ | 0 | Cyclohexyl |
| $C_6H_5$ | 0 | 2-methylcyclopentyl |
| $(CH_2)_3CH_3$ | 0 | Cyclobuty. |
| $C_6H_5$ | 0 | $CH_3$ |
| $C_6H_5$ | 0 | $CH(CH_3)_2$ |
| $C_6H_5$ | 0 | Cyclopropyl |
| $C_6H_5$ | 0 | $(CH_2)_4CH_3$ |
| $C_6H_5$ | 0 | $CH(CH_3)CH(CH_3)_2$ |
| $C_6H_5$ | 0 | $CH_2CH_3$ |
| $C_6H_5$ | 0 | $(CH_2)_2CH_3$ |
| $C_6H_5$ | 0 | $(CH_2)_5CH_3$ |
| $C_6H_5$ | 0 | $C(CH_3)_3$ |

EXAMPLE III 2-(N-methylcarboxamido)-3-methylthioquinoxaline-di-N-oxide

Methylamine gas is slowly bubbled, over a period of 20 min., into a solution of 13.6 g. (0.1 mole) of benzofuroxan and 22.4 g. (0.1 mole) of ethyl phenylthiopyruvate dissolved in 210 ml. of ethanol. The reaction mixture is allowed to remain at room temperature for 3hrs., after which the resulting product is filtered, dried and recrystallized from methanol.

EXAMPLE IV

The procedure of Example III is repeated, using the appropriate ester, benzofuran and amine, to provide the following products:

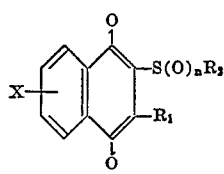

| X | $R_1$ | $n$ | $R_2$ |
|---|---|---|---|
| H | $CONHCH_3$ | 0 | $C_2H_5$ |
| H | $CONHC_2H_5$ | 0 | $CH_3$ |
| H | $CONHCH_3$ | 0 | Cyclopropyl |
| H | $CON(CH_3)_2$ | 0 | Cyclohexyl |
| H | $CON(CH_3)C_2H_5$ | 0 | Phenyl |
| Cl | $CONHCH_3$ | 0 | $(CH_2)_2CH_3$ |
| Cl | $CONH(CH_2)_2CH_3$ | 0 | $CH(CH_3)(CH_2)_2CH_3$ |
| Cl | $CON[CH(CH_3)_2]_2$ | 0 | $CH_3$ |
| Cl | $CONHCH(CH_3)_2$ | 0 | p-Chlorophenyl |
| F | $CONH_2$ | 0 | $CH_3$ |
| F | $CON(C_2H_5)$ | 0 | m-Methoxyphenyl |
| F | $CONHC_2H_5$ | 0 | 2',4'-dichlorobenzyl |
| F | $CONHC_2H_5$ | 0 | 4'-methoxybenzyl |

TABLE—Continued

| X | $R_1$ | $n$ | $R_2$ |
|---|---|---|---|
| F | $CONH_2$ | 0 | 2'-trifluoromethylphenyl |
| $CF_3$ | $CONH_2$ | 0 | 2'-methyl-3'-chlorophenyl |
| $CF_3$ | $CONHCH_3$ | 0 | Cyclohexyl |
| $CF_3$ | $CONHC_2H_5$ | 0 | Cyclopentyl |
| $CF_3$ | $CON(CH_3)C_2H_5$ | 0 | 4'-methylthiophenyl |
| $CF_3$ | $CON(C_2H_5)_2$ | 0 | 3'-nitrobenzyl |
| $OCH_3$ | $CONH(CH_2)_3CH_3$ | 0 | Cyclopentyl |
| $OCH_3$ | $CON(C_2H_5)_2$ | 0 | $CH_3$ |
| $OCH_3$ | $CONHCH(CH_3)_2$ | 0 | $CH(CH_3)_2$ |
| $OCH_3$ | $CONH_2$ | 0 | $(CH_2)_2CH_3$ |
| $CH_3$ | $CONH_2$ | 0 | Phenyl |
| $CH_3$ | $CONHCH_3$ | 0 | Cyclobutyl |
| $CH_3$ | $CON(CH_3)_2$ | 0 | 4'-methylthiophenyl |
| $CH_3$ | $CON(CH_3)C_2H_5$ | 0 | 4'-trifluoromethoxyphenyl |
| $CH_3$ | $CONHC_2H_5$ | 0 | 3'-bromobenzyl |

EXAMPLE V 3-methylthio-2-quinoxalinecarboxylic acid, ethyl ester, di-N-oxide

To 2.36 g. (0.01 mole) of 3-methylthio-2-quinoxalinecarboxaldehyde-di-N-oxide dissolved in 25 ml. of acetone is added is added dropwise 5 ml. of water containing 1 g. of chromium trioxide and 0.87 ml. of 12 M sulfuric acid solution. The resulting two phase mixture is allowed to stir at room temperature for 2 hrs., after which the reaction mixture is diluted with water and the resulting precipitate filtered and dried.

The above crude acid is dissolved in 15 ml. of ethanol and hydrogen chloride gas passed into the solution until it is saturated. The resulting solution is then heated to reflux for 45 min., followed by removal of the excess hydrogen chloride and ethanol under reduced pressure. The residual product is purified by recrystallization from methanol.

EXAMPLE VI

The general procedures of Example V are repeated, using the appropriately substituted starting materials, to provide the following analogs:

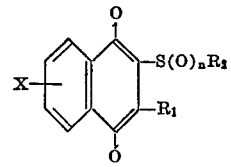

| X | $R_1$ | $n$ | $R_2$ |
|---|---|---|---|
| H | $CO_2CH_3$ | 0 | $CH_3$ |
| F | $CO_2CH_3$ | 0 | $C_2H_5$ |
| Cl | $CO_2CH_3$ | 0 | $CH(CH_3)_2$ |
| $CF_3$ | $CO_2CH_3$ | 0 | $CH_3$ |
| $OCH_3$ | $CO_2CH_3$ | 0 | $CH_3$ |
| $CH_3$ | $CO_2CH_3$ | 0 | $(CH_2)_4CH_3$ |
| H | $CO_2C_2H_5$ | 0 | $CH(CH_3)(CH_2)_2CH_3$ |
| F | $CO_2C_2H_5$ | 0 | $CH_3$ |
| Cl | $CO_2C_2H_5$ | 0 | $CH_2CH(CH_3)_2$ |
| $CF_3$ | $CO_2C_2H_5$ | 0 | $(CH_2)_2CH_3$ |
| $OCH_3$ | $CO_2C_2H_5$ | 0 | $(CH_2)_5CH_3$ |
| $CH_3$ | $CO_2C_2H_5$ | 0 | $(CH_2)_2CH(CH_3)_2$ |
| H | $CO_2(CH_2)_2CH_3$ | 0 | $CH_3$ |
| F | $CO_2(CH_2)_2CH_3$ | 0 | $C_2H_5$ |
| Cl | $CO_2(CH_2)_2CH_3$ | 0 | $CH(CH_3)_2$ |
| $CF_3$ | $CO_2(CH_2)_2CH_3$ | 0 | $(CH_2)_4CH_3$ |
| $OCH_3$ | $CO_2(CH_2)_2CH_3$ | 0 | $CH(C_2H_5)_2$ |
| $CH_3$ | $CO_2(CH_2)_2CH_3$ | 0 | $CH_3$ |
| H | $CO_2CH(CH_3)_2$ | 0 | $CH_3$ |
| F | $CO_2CH(CH_3)_2$ | 0 | $C_2H_5$ |
| Cl | $CO_2CH(CH_3)_2$ | 0 | $C(CH_3)_4$ |
| $CF_3$ | $CO_2CH(CH_3)_2$ | 0 | $(CH_2)_4CH_3$ |
| $OCH_3$ | $CO_2CH(CH_3)_2$ | 0 | $CH_3$ |
| $CH_3$ | $CO_2CH(CH_3)_2$ | 0 | $CH_3$ |

EXAMPLE VII 2-methyl-3-phenylthioquinoxaline-di-N-oxide

To a solution of 16.6 g. (0.1 mole) of phenylacetonylsulfide in 200 ml. of methanol is added 13.6 g. (0.1 mole) of benzofuroxan. Ammonia gas is bubbled into the mixture at room temperature for a period of 15 min., after which the reaction mixture is allowed to stand for 4.5 hrs. The resulting precipitate is filtered with suction, and the product dried and recrystallized from methanol, M.P. 153–154° C.

*Analysis.*—Calcd. for $C_{15}H_{12}O_2N_2S$ (percent): C, 63.37; H, 4.23; N, 9.87. Found (percent): C, 63.26; H, 4.11; N, 10.12.

EXAMPLE VIII

The procedure of Example VIII is repeated, using equivalent amounts of the appropriately substituted substrates, to provide the following produces:

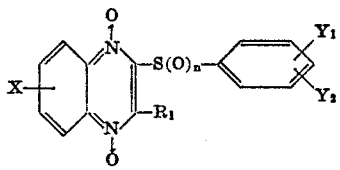

| X | $R_1$ | n | $Y_1$ | $Y_2$ |
|---|---|---|---|---|
| $SO_2NH_2$ | $CH_3$ | 0 | H | H |
| $SO_2NHCH_3$ | $C_2H_5$ | 0 | H | 4'-F |
| $SO_2N(CH_3)_2$ | $CH_3$ | 0 | H | 3'-OCH_3 |
| $SO_2NH_2$ | $CH(CH_3)_2$ | 0 | 2'-Cl | 4'-Cl |
| $SO_2NHCH_3$ | $(CH_2)_2CH_3$ | 0 | H | 4'-Br |
| $SO_2N(CH_3)_2$ | $CH_3$ | 0 | 2'-Br | H |
| $SO_2NH_2$ | $CH_3$ | 0 | H | 4'-SC_2H_5 |
| $SO_2NHCH_3$ | $CH_3$ | 0 | H | 4'-OC_2H_5 |
| $SO_2NH(CH_3)_2$ | $(CH_2)_2CH_3$ | 0 | H | 3'-CH_3 |
| $SO_2NHCH_3$ | $CH(CH_3)C_2H_5$ | 0 | H | 4'-C_3H_7 |
| $SO_2N(CH_3)_2$ | $C_2H_5$ | 0 | 2'-CH_3 | 4'-CH_3 |
| $SO_2NHCH_3$ | $CH_3$ | 0 | 2'-F | H |
| $SO_2NHCH_3$ | $CH_3$ | 0 | H | 4'-SCH_3 |
| $SO_2NHCH_3$ | $C_2H_5$ | 0 | H | 4'-CF_3 |
| $SO_2NH_2$ | $CH_3$ | 0 | H | 3'-NO_2 |
| $SO_2NH_2$ | $(CH_2)_2CH_3$ | 0 | H | 3'-OCF_3 |
| $SO_2NH_2$ | $C(CH_3)_3$ | 0 | H | 4'-(CH_2)_2CH_3 |
| $SO_2NHCH_3$ | $CH_3$ | 0 | H | 4'-CF_3 |
| $SO_2N(CH_3)_2$ | $CH_3$ | 0 | 2'-Cl | 4'-CF_3 |
| $SO_2NHCH_3$ | $CH(CH_3)_2$ | 0 | 2'-Cl | 4'-CH_3 |
| $SO_2N(CH_3)_2$ | $CH_3$ | 0 | 2'-CH_3 | 6'-CH_3 |
| $SO_2NH_2$ | $CH_3$ | 0 | 2'-CH_3 | 3'-NO_2 |
| $SO_2N(CH_3)_2$ | $CH_3$ | 0 | 3'-CH_3 | 4'-F |
| $SO_2NH_2$ | $(CH_2)_2CH_3$ | 0 | 2'-F | 4'-Br |
| $SO_2N(CH_3)_2$ | $CH_3$ | 0 | 2'-Cl | 4'-S(CH_2)_2CH_3 |
| $SO_2NHCH_3$ | $CH_3$ | 0 | H | 4'-OCF_3 |
| $SO_2NHCH_3$ | $C_2H_5$ | 0 | H | 4'-OCH_3 |
| $SO_2N(CH_3)_2$ | $CH_3$ | 0 | H | 4'-OCH(CH_3)_2 |

EXAMPLE IX

The procedures of Example VIII are again repeated, using the appropriate starting materials, to provide the following analogs:

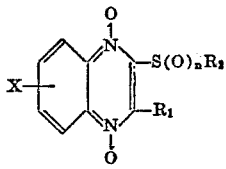

| X | $R_1$ | n | $R_2$ |
|---|---|---|---|
| $CO_2H$ | H | 0 | Methyl. |
| $CO_2H$ | H | 0 | Ethyl. |
| $CO_2H$ | φ | 0 | i-Propyl. |
| $CO_2H$ | φ | 0 | Phenyl. |
| $CO_2CH_3$ | H | 0 | m-Chlorophenyl. |
| $CO_2C_2H_5$ | φ | 0 | p-Fluorophenyl. |
| $CO_2H$ | φ | 0 | Cyclohexyl. |
| $CO_2CH(CH_3)$ | H | 0 | Cyclopropyl. |
| $CO_2(CH_2)_3CH_3$ | H | 0 | Methyl. |
| $CO_2CH_3$ | φ | 0 | Do. |
| $CO_2H$ | φ | 0 | p-Fluorophenyl. |
| $CO_2H$ | H | 0 | p-Trifluorophenyl. |
| $CO_2H$ | H | 0 | p-Methoxybenzyl. |
| $CO_2(CH_2)_2CH_3$ | φ | 0 | p-Bromobenzyl. |
| $CO_2CH(CH_3)CH_2CH_3$ | φ | 0 | p-Methylthiophenyl. |
| $CO_2H$ | φ | 0 | Cyclopentyl. |

EXAMPLE X

Preparation of sulfoxides and sulfones (A) *Sulfoxides.*—To the sulfide (0.1 mole) dissolved in 200 ml. of chloroform, cooled in an ice bath, is added a solution of m-chloroperbenzoic acid (0.1 mole) in 150 ml. of the same solvent. The reaction mixture is allowed to stand at room temperature overnight, after which the resulting mixture is treated with additional solvent and washed several times with a sodium bicarbonate solution. The chloroform layer is separated, dried over sodium sulfate and concentrated to dryness under vacuum to yield the desired product.

(B) *Sulfones.*—To the sulfide (0.1 mole) dissolved in 200 ml. of dry chloroform, cooled in an ice bath, is added, dropwise, a solution of m-chloroperbenzoic acid (0.2 mole) in 200 ml. of chloroform. The mixture is allowed to stand overnight at room temperature, and is then washed several times with a sodium bicarbonate solution. The chloroform layer is separated and dried. Evaporation of the solvent in vacuo provides the crude product.

EXAMPLE XI

Using the procedures of Example X, and starting with the appropriate sulfides, the following sulfoxides and sulfones are prepared:

2-methyl-3-methylsulfinylquinoxaline-di-N-oxide.

2-methyl-3-methylsulfinyl-6- and 7-chloroquinoxaline-di-N-oxide.

2-methyl-3-methylsulfinyl-6- and 7-methoxyquinoxaline-di-N-oxide.

2-methyl-3-methylsulfinyl-6- and 7-fluoroquinoxaline-di-N-oxide.

2-methyl-3-phenylsulfinylquinoxaline-di-N-oxide.

2-methyl-3-methylsulfonylquinoxaline-di-N-oxide.

2-methyl-3-methylsulfonyl-6- and 7-chloroquinoxaline-di-N-oxide.

2-methyl-3-methylsulfonyl-6- and 7-methoxyquinoxaline-di-N-oxide.

2-methyl-3-methylsulfonyl-6- and 7-fluoroquinoxaline-di-N-oxide.

EXAMPLE XII

The procedures of Example X are repeated, using equivalent amounts of requisite starting materials, to provide the following compounds:

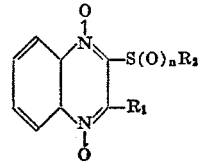

| $R_1$ | n | $R_2$ |
|---|---|---|
| $CH_3$ | 1 | $C_2H_5$ |
| $CH_3$ | 2 | $C_2H_5$ |
| $C_2H_5$ | 1 | $CH_3$ |
| $C_2H_5$ | 2 | $CH_3$ |
| $CH_3$ | 1 | $CH(CH_3)_2$ |
| $CH_3$ | 2 | $CH(CH_3)_2$ |
| $CH_3$ | 1 | $(CH_2)_2CH_3$ |
| $CH_3$ | 2 | $(CH_2)_2CH_3$ |
| $CH(CH_3)_2$ | 1 | $CH_3$ |
| $CH(CH_3)_2$ | 1 | $C_2H_5$ |
| φ | 1 | $CH_3$ |
| φ | 2 | $CH_3$ |
| $CH_3$ | 1 | $CH(CH_3)CH(CH_3)_2$ |
| $CH_3$ | 2 | $CH(CH_3)CH(CH_3)_2$ |
| $CH_3$ | 1 | $(CH_2)_5CH_3$ |
| $CH_3$ | 2 | $(CH_2)_5CH_3$ |
| $CH_3$ | 1 | $C(CH_3)_3$ |
| $CH_3$ | 2 | $C(CH_3)_3$ |
| φ | 2 | $CH(CH_3)_2$ |
| φ | 2 | $C_2H_5$ |
| $CH(CH_3)(CH_2)_3CH_3$ | 1 | $(CH_2)_2CH_3$ |
| $CH(CH_3)(CH_2)_3CH_3$ | 2 | $(CH_2)_2CH_3$ |
| $(CH_2)_3CH_3$ | 1 | $CH_3$ |
| $(CH_2)_3CH_3$ | 2 | $CH_3$ |
| $C(CH_3)_3$ | 2 | $CH(CH_3)_2$ |
| $CH_3$ | 2 | $CH_2—C(CH_3)_3$ |
| $C_2H_5$ | 1 | $C_2H_5$ |
| $C_2H_5$ | 2 | $C_2H_5$ |
| φ | 2 | $(CH_2)_5CH_3$ |
| φ | 2 | $CH(CH_3)CH(CH_3)_2$ |

EXAMPLE XIII

2-bromomethyl-3-methylthioquinoxaline-di-N-oxide

To a solution of 2.2 g. (0.1 mole) of 2-methyl-3-methylthioquinoxaline-di-N-oxide in 25 ml. of refluxing ethylacetate is added rapidly 1.6 g. (0.1 mole) of bromine in 25 ml. of the same solvent. The reaction mixture is allowed to reflux for 10 min., and is then cooled in an ice bath. The product is filtered and recrystallized from methanol, M.P. 136–137° C.

*Analysis.*—Calcd. for $C_{10}H_9BrO_2N_2S$ (percent): C, 39.87; H, 2.99; N, 9.00. Found (percent): C, 41.23; H, 3.26; N, 9.32.

EXAMPLE XIV

The procedure of Example XIII is followed, using the appropriate starting materials, to provide the following congeners:

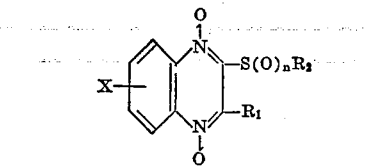

| X | $R_1$ | n | $R_2$ |
|---|---|---|---|
| H | $CH_2Br$ | 0 | Ethyl. |
| H | $CHBrCH_3$ | 0 | Cyclopropyl. |
| H | $CHBrC_2H_5$ | 0 | i-Propyl. |
| H | $CHBr(CH_2)_3CH_3$ | 0 | n-Propyl. |
| H | $CHBrCH(CH_3)_2$ | 0 | Cyclohexyl. |
| Cl | $C(CH_3)BrCH_3$ | 0 | Methyl. |
| Cl | $CH_2Br$ | 0 | Do. |
| Cl | $CHBrCH(CH_3)_2$ | 0 | Cyclopentyl. |
| Cl | $CH_2Br$ | 0 | n-Pentyl. |
| Cl | $CH_2Br$ | 0 | s-Butyl. |
| Cl | $CHBrCH_3$ | 0 | t-Butyl. |
| Cl | $CHBrC(CH_3)_3$ | 0 | Cyclohexyl. |
| F | $CH_2Br$ | 0 | Methyl. |
| F | $CHBrC_2H_5$ | 0 | i-Propyl. |
| F | $CH_2Br$ | 0 | Cyclohexyl. |
| F | $CH_2BrCH(CH_3)_2$ | 0 | Cyclobutyl. |
| F | $CH_2Br$ | 0 | Cyclopropyl. |
| F | $CHBrCH_2CH(CH_3)_2$ | 0 | Methyl. |
| F | $CHBrC_2H_5$ | 0 | Ethyl. |
| F | $CH_2Br$ | 0 | s-Butyl. |

EXAMPLE XV

The procedures of Examples XIII and XIV are repeated, using the appropriately substituted starting materials and chlorine in place of bromine, to yield the following quinoxaline-di-N-oxides:

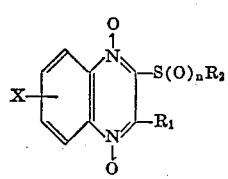

| X | $R_1$ | n | $R_2$ |
|---|---|---|---|
| $CH_3$ | $CH_2Cl$ | 0 | Cyclopropyl. |
| $CH_3$ | $CH_2Cl$ | 0 | Cyclohexyl. |
| $CH_3$ | $CHClCH_3$ | 0 | Cyclopentyl. |
| $CH_3$ | $CHCl(CH_2)_2CH_3$ | 0 | Phenyl. |
| $CH_3$ | $CH_2Cl$ | 0 | p-Fluorophenyl. |
| $CH_3$ | $CHClCH(CH_3)_2$ | 0 | m-Methoxyphenyl. |
| $CH_3$ | $CHClCH_2CH(CH_3)_2$ | 0 | Cyclopentyl. |
| $CH_3$ | $CHClC(CH_3)_3$ | 0 | o-Ethylphenyl. |
| $CH_3$ | $CHClCH_3$ | 0 | p-Bromophenyl. |
| $OCH_3$ | $CH_2Cl$ | 0 | Cyclohexyl. |
| $OCH_3$ | $CH_2Cl$ | 0 | Phenyl. |
| $OCH_3$ | $CHClC_2H_5$ | 0 | Do. |
| $OCH_3$ | $CH_2Cl$ | 0 | Benzyl. |
| $OCH_3$ | $CHClCH(CH_3)_2$ | 0 | Cyclohexyl. |
| $OCH_3$ | $C(CH_3)ClCH_3$ | 0 | Cyclobutyl. |
| $OCH_3$ | $CHCl(CH_2)_4CH_3$ | 0 | m-Fluorobenzyl. |
| $OCH_3$ | $CHCl(CH_2)CH_3$ | 0 | p-Methoxybenzyl. |
| $OCH_3$ | $CH_2Cl$ | 0 | o-Methylthiophenyl. |
| $OCH_3$ | $CHClC_2H_5$ | 0 | Cyclopropyl. |
| $OCH_3$ | $CHCl(CH_2)_3CH_3$ | 0 | Cyclohexyl. |
| $CF_3$ | $CH_2Cl$ | 0 | Cyclopropyl. |
| $CF_3$ | $CHClCH_3$ | 0 | Cyclohexyl. |
| $CF_3$ | $CHClCH_3$ | 0 | Phenyl. |
| $CF_3$ | $CHClCH(CH_3)_2$ | 0 | p-Methoxyphenyl. |
| $CF_3$ | $CH_2Cl$ | 0 | o-Methylphenyl. |
| $CF_3$ | $CHCl(CH_2)_3CH_3$ | 0 | Benzyl. |
| $CF_3$ | $CH_2Cl$ | 0 | p-Chlorobenzyl. |
| $CF_3$ | $CHClCH_2CH(CH_3)_2$ | 0 | Do. |
| $CF_3$ | $C(CH_3)ClCH_3$ | 0 | Cyclopentyl. |
| $CF_3$ | $CH_2Cl$ | 0 | Benzyl. |

EXAMPLE XVI

The procedures of Example X are followed, using equivalent amounts of the requisite starting sulfides, to provide the following congeners:

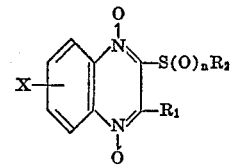

| X | $R_1$ | n | $R_2$ |
|---|---|---|---|
| H | $CH_2Br$ | 1 | $CH_3$ |
| H | $CH_2Br$ | 2 | $CH_3$ |
| H | $CH_2Cl$ | 1 | $CH_3$ |
| H | $CH_2Cl$ | 2 | $CH_3$ |
| Cl | $CHClCH(CH_3)_2$ | 1 | $CH(CH_3)_2$ |
| Cl | $CHClCH_2(CH_3)_2$ | 2 | $CH(CH_3)_2$ |
| Cl | $CHBrC_2H_5$ | 1 | $CH_3$ |
| Cl | $CHBrC_2H_5$ | 2 | $CH_3$ |
| F | $CHCl(CH_2)_2CH_3$ | 1 | $(CH_2)_4CH_3$ |
| F | $CHCl(CH_2)_2CH_3$ | 2 | $(CH_2)_4CH_3$ |
| F | $CH_2Cl$ | 1 | $CH_3$ |
| F | $CH_2Cl$ | 2 | $CH_3$ |
| F | $CH_2Br$ | 1 | $C_2H_5$ |
| F | $CH_2Br$ | 2 | $C_2H_5$ |
| $CH_3$ | $CHCl(CH_2)_3CH_3$ | 1 | $CH(CH_3)_2$ |
| $CH_3$ | $CHCl(CH_2)_3CH_3$ | 2 | $CH(CH_3)_2$ |
| $CH_3$ | $CH_2Br$ | 1 | $CH_3$ |
| $CH_3$ | $CH_2Br$ | 2 | $CH_3$ |
| $OCH_3$ | $CH_2Cl$ | 1 | $(CH_2)_5CH_3$ |
| $OCH_3$ | $CH_2Cl$ | 2 | $(CH_2)_5CH_3$ |
| $OCH_3$ | $CHBrC_2H_5$ | 1 | $CH_3$ |
| $OCH_3$ | $CHBrC_2H_5$ | 2 | $CH_3$ |
| $OCH_3$ | $CHClCH_2CH(CH_3)_2$ | 1 | $CH_3$ |
| $OCH_3$ | $CHBrCH(CH_3)_2$ | 1 | $CH(CH_3)(CH_2)_2CH_3$ |
| $OCH_3$ | $CH_2Br$ | 2 | $CH_3$ |
| $CF_3$ | $CH_2Cl$ | 1 | $CH_3$ |
| $CF_3$ | $CH_2Cl$ | 2 | $CH_3$ |
| $CF_3$ | $CH_2Br$ | 1 | $CH_3$ |
| $CF_3$ | $CHCl(CH_2)_4CH_3$ | 2 | $C_2H_5$ |
| $CF_3$ | $CH_2Br$ | 1 | $CH(CH_3)_2$ |
| $CF_3$ | $CH_2Br$ | 2 | $CH(CH_3)_2$ |
| $CF_3$ | $CHClC_2H_5$ | 1 | $C(CH_3)_3$ |
| $CF_3$ | $CHClC_2H_5$ | 2 | $C(CH_3)_3$ |
| $SO_2NH_2$ | $CH_2Br$ | 1 | $CH_2CH(CH_3)_2$ |
| $SO_2NH_2$ | $CH_2Br$ | 2 | $CH_2CH(CH_3)_2$ |
| $SO_2NHCH_3$ | $CH_2Cl$ | 1 | $(CH_2)_2CH(CH_3)_2$ |
| $SO_2NHCH_3$ | $CHClC_2H_5$ | 1 | $C_2H_5$ |
| $SO_2NHCH_3$ | $CHClC_2H_5$ | 1 | $CH_3$ |
| $SO_2NHCH_3$ | $CHBrCH_3$ | 2 | $C_2H_5$ |
| $SO_2N(CH_3)_2$ | $CH_2Br$ | 2 | $CH_3$ |
| $SO_2N(CH_3)_2$ | $CH_2Cl$ | 2 | $CH_3$ |
| $SO_2N(CH_3)_2$ | $CHCl(CH_2)_3CH_3$ | 1 | $C_2H_5$ |
| $SO_2N(CH_3)_2$ | $CHClCH_2(CH_3)_2$ | 2 | $C_2H_5$ |
| $CO_2CH_3$ | $CH_2Cl$ | 1 | $CH(CH_3)_2$ |
| $CO_2CH_3$ | $CH_2Cl$ | 2 | $CH(CH_3)_2$ |
| $CO_2CH_3$ | $CH_2Br$ | 2 | $CH_3$ |
| $CO_2CH(CH_3)_2$ | $CH_2Br$ | 2 | $CH_3$ |
| $CO_2C_2H_5$ | $CH_2Cl$ | 2 | $CH_3$ |

EXAMPLE XVII 2-acetoxymethyl-3-methylthioquinoxaline-di-N-oxide

To a solution of 1.0 g. (0.003 mole) of 2-bromomethyl-3-methylthioquinoxaline-di-N-oxide in 10 ml. of hexamethylphosphoramide is added 0.5 g. (0.003 mole) of silver acetate, and the resulting mixture is heated at steam bath temperatures for several hours. The reaction mixture is then diluted with sufficient water to cause the product to precipitate, and is filtered with suction. The desired product is extracted from the silver bromide with chloroform, and the chloroform is concentrated to dryness in vacuo. The product is purified by recrystallization from isopropanol.

EXAMPLE XVIII

The procedure of Example XVII is followed, using the appropriate α-bromoalkyl- or α-chloroalkylquinoxaline-di-N-oxide, to provide the following compounds:

[Structure: quinoxaline-di-N-oxide with X substituent, $S(O)_nR_2$ and $R_1$ groups]

| $R_1$ | $n$ | $R_2$ |
|---|---|---|
| CH₂OCOCH₃ | 0 | Ethyl. |
| CH(OCOCH₃)CH₃ | 0 | Methyl. |
| CH(OCOCH₃)CH₃ | 0 | i-Propyl. |
| CH(OCOCH₃)CH(CH₃)₂ | 0 | n-Propyl. |
| CH₂OCOCH₃ | 0 | n-Hexyl. |
| CH(OCOCH₃)(CH₂)₂CH₃ | 0 | Methyl. |
| CH(OCOCH₃)C(CH₃)₃ | 0 | s-Butyl. |
| CH₂OCOCH₃ | 0 | t-Butyl. |
| CH(OCOCH₃)CH₂CH(CH₃)₂ | 0 | Methyl. |
| CH(OCOCH₃)CH(CH₃)₂ | 0 | n-Pentyl. |
| C(CH₃)(OCOCH₃)CH₃ | 0 | Methyl. |
| CH₂OCOCH₃ | 0 | n-Butyl. |
| CH₂OCOCH₃ | 0 | n-Pentyl. |
| CH(OCOCH₃)(CH₂)₄CH₃ | 0 | Methyl. |
| CH(OCOCH₃)CH(CH₃)₂ | 0 | Ethyl. |

EXAMPLE XIX

The procedures of Example XI are again repeated, using equivalent amounts of the requisite starting materials, to provide the following compounds:

[Structure: quinoxaline-di-N-oxide with $S(O)_nR_2$ and $R_1$ groups]

| $R_1$ | $n$ | $R_2$ |
|---|---|---|
| CH₂OCOCH₃ | 1 | Cyclopropyl. |
| CH₂OCOCH₃ | 2 | Do. |
| CH₂OCOCH₃ | 1 | Cyclopentyl. |
| CH₂OCOCH₃ | 2 | p-Trifluoromethylphenyl. |
| CH₂OCOCH₃ | 2 | Cyclohexyl. |
| CH(OCOCH₃)CH₃ | 1 | Cyclobutyl. |
| CH₂OCOCH₃ | 1 | Phenyl. |
| CH₂OCOCH₃ | 2 | Do. |
| CH(OCOCH₃)CH(CH₃)₂ | 2 | Cyclohexyl. |
| CH(OCOCH₃)CH₃ | 1 | Do. |
| CH(OCOCH₃)CH₃ | 2 | Do. |
| CH(OCOCH₃)CH₃ | 1 | p-Methoxyphenyl. |
| CH(OCOCH₃)CH₃ | 2 | Do. |
| CH(OCOCH₃)CH₂CH₃ | 2 | p-Fluorophenyl. |
| CH(OCOCH₃)(CH₂)₃CH₃ | 2 | m-Methylthiophenyl. |
| CH(OCOCH₃)CH₂CH(CH₃)₂ | 2 | o-Methylphenyl. |
| CH₂OCOCH₃ | 2 | p-n-Propylphenyl. |
| CH₂OCOCH₃ | 2 | p-Nitrophenyl. |
| CH(OCOCH₃)C(CH₃)₃ | 2 | Cyclohexyl. |
| C(CH₃)(OCOCH₃)CH₃ | 2 | Cyclopentyl. |
| CH(OCOCH₃)CH(CH₃)₂ | 2 | m-Bromophenyl. |

EXAMPLE XX 2-(α-hydroxyethyl)-3-phenylthioquinoxaline-di-N-oxide

To a solution of 3.56 g. (0.01 mole) of 2-(α-acetoxyethyl)-3-phenylthioquinoxaline-di-N-oxide in 25 ml. of methanol is added 25 ml. of 12 N hydrochloric acid solution, and the resulting mixture is heated at steam bath temperatures. Thin layer chromatography samples, removed periodically, indicate the reaction is substantially complete in 5 hrs. The reaction mixture is then cooled in an ice bath and the precipitated product is filtered and dried. Further purification of the desired product is carried out by recrystallization from ethanol.

EXAMPLE XXI

The procedure of Example XX is repeated, employing equivalent amounts of starting reagents, to provide the following analogs:

[Structure: quinoxaline-di-N-oxide with $S(O)_nR_2$ and $R_1$ groups]

| $R_1$ | $n$ | $R_2$ |
|---|---|---|
| CH₂OH | 0 | CH₃ |
| CH₂OH | 0 | C₂H₅ |
| CH(OH)CH₃ | 0 | CH₃ |
| CH(OH)CH₂CH₃ | 0 | C₂H₅ |
| CH(OH)(CH₂)₂CH₃ | 0 | CH₃ |
| CH₂OH | 0 | (CH₂)₂CH₃ |
| CH₂OH | 0 | CH(CH₃)₂ |
| CH₂OH | 0 | (CH₂)₃CH₃ |
| CH(OH)CH₂CH(CH₃)₂ | 0 | C₂H₅ |
| CH(OH)(CH₂)₃CH₃ | 0 | CH₃ |
| CH(OH)CH₃ | 0 | CH₂CH(CH₃)₂ |
| CH(OH)CH₃ | 0 | (CH₂)₅CH₃ |
| CH(OH)CH(CH₃)₂ | 0 | (CH₂)₂CH(CH₃)₂ |
| CH(OH)(CH₂)₄CH₃ | 0 | C(CH₃)₃ |
| CH₂OH | 0 | CH(CH₃)CH(CH₃)₂ |
| C(OH)(CH₃)₂ | 0 | CH₃ |

EXAMPLE XXII

The procedures of Example X are again repeated, using the appropriately substituted 2-(α-hydroxymethyl)quinoxaline-di-N-oxide, to provide the following sulfoxides and sulfones:

[Structure: quinoxaline-di-N-oxide with X substituent, $S(O)_nR$ and $R_1$ groups]

| X | $n$ | $R_2$ |
|---|---|---|
| H | 1 | Methyl. |
| H | 2 | Do. |
| H | 1 | Ethyl. |
| H | 2 | Do. |
| H | 1 | n-Propyl. |
| H | 2 | Do. |
| H | 1 | n-Butyl. |
| H | 2 | Do. |
| H | 2 | i-Propyl. |
| H | 1 | n-Pentyl. |
| H | 2 | n-Hexyl. |
| H | 2 | s-Butyl. |
| H | 2 | t-Butyl. |
| Cl | 1 | Methyl. |
| Cl | 2 | Ethyl. |
| Cl | 1 | i-Propyl. |
| H | 1 | 3-methyl-n-pentyl. |
| H | 2 | Do. |
| Cl | 2 | n-Propyl. |
| Cl | 2 | Do. |
| Cl | 2 | i-Propyl. |
| Cl | 1 | n-Pentyl. |
| Cl | 2 | Do. |
| H | 1 | 2,3-dimethyl-n-butyl. |
| H | 2 | Do. |

EXAMPLE XXIII 2-(α-cyano-n-propyl)-3-cyclohexylthioquinoxaline-di-N-oxide

To a solution of 659.2 mg. (0.02 mole) of lithium cyanide dissolved in a minimum amount of water is added 3.97 g. (0.01 mole) of 2-(α-bromo-n-propyl)-3-cyclohexylthioquinoxaline-di-N-oxide in 40 ml. of hexamethylphosphoramide. The resulting mixture is heated on a steam bath for 3 hrs., after which it is poured into a mixture of ice and water. The resulting precipitate is filtered with suction and dried. Recrystallization from methanol provides the purified product.

EXAMPLE XXIV

The procedure of Example XXIII is employed, using equivalent amounts of the appropriately substituted quinoxaline-di-N-oxide, to provide the following products:

2-cyanomethyl-3-methylthioquinoxaline-di-N-oxide.
2-cyanomethyl-3-phenylthioquinoxaline-di-N-oxide.
2-cyanomethyl-3-n-butyl-6- and 7 - chloroquinoxaline-di-N-oxide.
2-(α-cyano-n-butyl) - 3 - cyclohexylthioquinoxaline-di-N-oxide.
2-(α-cyanoethyl)-3 - (4' - methoxyphenyl)quinoxaline-di-N-oxide.
2-cyanomethyl-3-cyclopentylthio - 6- and 7 - sulfamyl-quinoxaline-di-N-oxide.
2-cyanomethyl-3-benzylthioquinoxaline-di-N-oxide.
2-(α-cyanoethyl) - 3 - (2',4' - difluorobenzylthio)quinoxaline-di-N-oxide.
2-cyanomethyl-3-(2'-chloro-4' - trifluoromethylphenylthio)-quinoxaline-di-N-oxide.
2-(α-cyano-n-hexyl)-3-ethylthioquinoxaline-di-N-oxide.
2-cyanomethyl-3-n-butylthio-6- and 7 - trifluoromethyl-quinoxaline-di-N-oxide.
2-cyanomethyl-3-cyclopropyl-6- and 7 - methylquinoxaline-di-N-oxide.
2-(α-cyano-n-butyl)-3-methylthio-6- and 7 - carboxy-quinoxaline-di-N-oxide.
2-cyanomethyl-3-(4' - ethylthiophenylthio)quinoxaline-di-N-oxide.
2-cyanomethyl-3-t-butylquinoxaline-di-N-oxide.

EXAMPLE XXV

The procedures of Example X are repeated, using equivalent amounts of the appropriately substituted starting materials, to provide the following analogs:

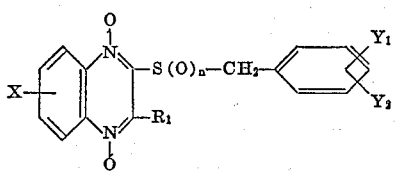

| X | R₁ | n | Y₁ | Y₂ |
|---|---|---|---|---|
| H | CH₂CN | 1 | H | H |
| H | CH₂CN | 2 | H | H |
| H | CH(CN)CH₃ | 1 | 2'—Cl | H |
| H | CH(CN)CH₃ | 2 | 2'—F | 4'—F |
| H | CH(CN)CH(CH₃)₂ | 2 | H | 4'—OCH₃ |
| H | CH(CN)(CH₂)₂CH₃ | 2 | H | 3'—CF₃ |
| H | CH(CN)CH₂CH(CH₃) | 1 | 2'—OCH₃ | 4'—Cl |
| H | CH(CN)(CH₂)₄CH₃ | 2 | H | 4'—OCF₃ |
| H | CH₂CN | 2 | H | 4'—SCH₃ |
| H | CH(CN)CH₃ | 1 | 2'—Br | 4'—Cl |
| Cl | CH₂CN | 1 | H | H |
| Cl | CH₂CN | 2 | H | H |
| Cl | CH₂CN | 2 | H | 4'Cl |
| Cl | CH₂CN | 2 | H | 4'—NO₂ |
| Cl | CH(CN)CH₃ | 1 | H | 3'—OCH₃ |
| Cl | CH(CN)CH₃ | 2 | 3'—OCH₃ | 4'—OCH₃ |
| Cl | CH(CN)CH₃ | 2 | H | 4'-n-C₃H₇ |
| Cl | CH(CN)(CH₂)₃CH₃ | 1 | H | 4'-F |
| Cl | CH(CN)CH(CH₃)₂ | 2 | 2'—Cl | 4'—NO₂ |
| Cl | CH(CN)CH₂CH(CH₃)₂ | 1 | H | H |
| Cl | CH(CN)CH₂CH(CH₃)₂ | 2 | H | H |
| Cl | C(CN)(CH₃)₂ | 2 | H | H |

EXAMPLE XXVI 2-ethylthiomethyl-3-methylsulfinylquinoxaline-di-N-oxide

To a solution of 924 mg. (0.011 mole) of sodium ethylmercaptide in 35 ml. of dimethylformamide, under an atmosphere of nitrogen, is added 3.17 g., 0.01 mole) of 2-bromomethyl-3-methylsulfinylquinoxaline-di-N - oxide. The reaction mixture is allowed to stir at room temperature for 6 hrs., and is then poured into ice and water, and the resulting precipitate filtered with suction. After the product has been dried, it is recrystallized from methanol.

EXAMPLE XXVII

The procedure of Example XXVI is repeated, using equivalent amounts of the appropriate starting chemicals, to provide the following congeners:

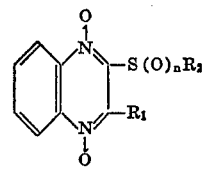

| R₁ | n | R₂ |
|---|---|---|
| CH₂SCH₃ | 0 | Methyl. |
| CH₂SCH₃ | 2 | Do. |
| CH₂SC₂H₅ | 1 | Do. |
| CH₂SC₃H₇ | 0 | Ethyl. |
| CH₂SC₃H₇ | 1 | Do. |
| CH₂SC₃H₇ | 2 | Do. |
| CH₂SCH₃ | 0 | Cyclohexyl. |
| CH₂SCH₃ | 2 | Do. |
| CH(SCH₃)CH₃ | 2 | n-Butyl. |
| CH(SCH₃)CH₃ | 2 | i-Propyl. |
| CH(SCH₃)C₂H₅ | 0 | n-Propyl. |
| CH(SCH₃)C₂H₅ | 2 | Do. |
| CH(SCH₃)C₂H₅ | 2 | Cyclopentyl. |
| CH(SCH₃)CH₂CH(CH₃)₂ | 2 | Do. |
| CH(SC₂H₅)CH₃ | 0 | Do. |
| CH(SC₂H₅)CH₃ | 2 | Do. |
| CH(SC₂H₅)C₂H₅ | 1 | s-Butyl. |
| CH(SC₂H₅)C₂H₅ | 2 | Do. |
| CH(SC₃H₇)CH₃ | 0 | t-Butyl. |
| CH(SC₃H₇)CH₃ | 2 | Do. |
| CH(SCH₃)CH₃ | 1 | n-Pentyl. |
| CH(SCH₃)CH₃ | 2 | Do. |
| CH₂S-C(CH₃)₃ | 1 | Methyl. |
| CH[SC(CH₃)₃]CH₃ | 2 | 3-methyl-n-butyl. |
| CH(SCH₃)(CH₂)₄CH₃ | 2 | Methyl. |
| CH(SC₄H₉)CH₃ | 2 | Do. |
| CH(SC₃H₇)CH(CH₃)₂ | 1 | Do. |
| CH₂SC₄H₉ | 2 | Cyclopropyl. |
| CH(SCH₃)CH(CH₃)CH(CH₃)₂ | 1 | Methyl. |
| CH₂SCH₃ | 2 | 2,3-dimethyl-n-butyl. |
| CH(SC₄H₉)(CH₂)₄CH₃ | 0 | Ethyl. |
| CH(SC₄H₉)(CH₂)₄CH₃ | 1 | Do. |

EXAMPLE XXVIII 2-methylsulfinylmethyl-3-methylsulfonylquinoxaline-di-N-oxide

To 3.0 g. (0.01 mole) of 2-methylthiomethyl-3-methylsulfonylquinoxaline-di-N-oxide in 20 ml. of dry chloroform is added dropwise, with stirring, 1.72 g. (0.01 mole) of m-chloroperbenzoic acid in 15 ml. of the same solvent. The reaction is allowed to remain overnight at room temperature, and is then poured into water. The chloroform layer is separated, washed several times with sodium bicarbonate solution and dried over sodium sulfate. Removal of the chloroform solvent under reduced pressure provides the desired product in a crude state of purity. Further purification is effected by recrystallization from methanol.

EXAMPLE XXIX 2-methylsulfonylmethyl-3-methylsulfonylquinoxaline-di-N-oxide

The procedure of Example XXVIII is repeated using 3.48 g. (0.02 mole) of m-chloroperbenzoic acid instead of 1.72 g. (0.01 mole). The resulting product is isolated in a similar manner and purified by recrystallization from ethanol.

EXAMPLE XXX

The procedures of Examples XXVIII and XXIX are repeated, using equivalent amounts of the appropriately substituted starting reagents, to yield the following compounds:

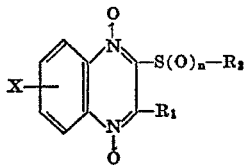

| X | R₁ | n | R₂ |
|---|---|---|---|
| H | CH₂SOCH₃ | 1 | C₂H₅ |
| H | CH₂SO₂CH₃ | 1 | C₂H₅ |
| H | CH₂SOCH₃ | 2 | C₂H₅ |
| H | CH₂SO₂CH₃ | 2 | C₂H₅ |
| H | CH₂SOC₂H₅ | 1 | n-C₃H₇ |
| H | CH₂SO₂C₂H₅ | 1 | i-C₃H₇ |
| H | CH(SOC₂H₅)C₂H₅ | 1 | C₂H₅ |
| Cl | CH₂SOC₄H₉ | 2 | CH₃ |
| Cl | CH₂SO₂C₄H₉ | 2 | C₂H₅ |
| Cl | CH(SO₂CH₃)CH₃ | 2 | CH₃ |
| Cl | CH(SO₂C₃H₇)C₂H₅ | 1 | i-C₃H₇ |
| Cl | CH(SO₂C₃H₇)C₂H₅ | 2 | i-C₃H₇ |
| Cl | CH(SOCH₃)C₅H₁₁ | 2 | CH₃ |
| Cl | CH₂SO₂CH₃ | 2 | CH₃ |
| F | CH₂SOCH₃ | 1 | i-C₄H₉ |
| F | CH₂SO₂CH₃ | 1 | i-C₄H₉ |
| F | CH(SOC₄H₉)C₅H₁₁ | 1 | CH₃ |
| F | CH₂SOCH₃ | 2 | n-C₆H₁₃ |
| F | CH₂SO₂C₄H₉ | 2 | n-C₅H₁₁ |
| F | CH(SOC₄H₉)C₅H₁₁ | 1 | CH₃ |
| F | CH(SO₂CH₃)CH₃ | 2 | s-C₄H₉ |
| CF₃ | CH₂SOCH₃ | 2 | CH₃ |
| CF₃ | CH₂SO₂CH₃ | 1 | C₃H₅ |
| CF₃ | CH(SOC₃H₇)C₂H₅ | 2 | n-C₄H₉ |
| CF₃ | CH(SO₂CH₃)C₄H₉ | 1 | C₂H₅ |
| CF₃ | CH₂SO₂C₄H₉ | 2 | CH₃ |
| CH₃ | CH₂SOCH₃ | 1 | 2,3-dimethyl-n-butyl |
| CH₃ | CH₂SOC₄H₉ | 2 | n-C₆H₁₃ |
| CH₃ | CH(SOC₂H₅)CH₃ | 2 | C₂H₅ |
| CH₃ | CH(SO₂CH₃)C₅H₁₁ | 2 | CH₃ |
| OCH₃ | CH₂SOC₄H₉ | 2 | CH₃ |
| OCH₃ | CH(SO₂C₄H₉)C₂H₅ | 1 | i-C₃H₇ |
| OCH₃ | CH(SO₂CH₃)CH₃ | 2 | 2-methyl-n-butyl |
| OCH₃ | CH(SOCH₃)C₂H₅ | 2 | 2,2-dimethyl-n-butyl |

EXAMPLE XXXI 2-(α-carboxy-n-butyl)-3-phenylthioquinoxaline-di-N-oxide

To a warm solution of 3.51 g. (0.01 mole) of 2-(α-cyano-n-butyl)-3-phenylthioquinoxaline-di-N-oxide in 20 ml. of methanol is added 30 ml. of 12 N hydrochloric acid solution. The reaction mixture is heated to reflux and maintained at this temperature for 6 hrs. or until thin layer chromatography samples indicate the reaction is complete. The methanol is removed from the reaction mixture under vacuum, and the product allowed to crystallize from the residual aqueous acid. The product is filtered, dried and recrystallized from methanol.

EXAMPLE XXXII

The following products are prepared by the procedure of Example XXXI, by substituting the appropriate starting materials:

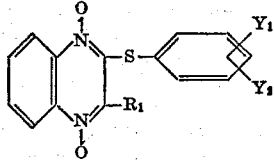

| R₁ | Y₁ | Y₂ |
|---|---|---|
| CH₂CO₂H | H | 4'—Cl |
| CH₂CO₂H | 2'—Cl | 4'—Cl |
| CH₂CO₂H | H | 3'—OC₂H₅ |
| CH₂CO₂H | 3'—OCH₃ | 4—OCH₃ |
| CH(CO₂H)CH₃ | 3'—F | H |
| CH(CO₂H)CH₃ | H | 4—F |
| CH(CO₂H)CH₃ | 2'—F | 4'—Cl |
| CH₂CO₂H | H | 4'—Br |
| CH(CO₂H)C₂H₅ | H | 4'—CF₃ |
| CH(CO₂H)C₂H₅ | H | 4'—NO₂ |
| CH(CO₂H)C₂H₅ | 2'—Cl | 4'—CF₃ |
| CH(CO₂H)CH(CH₃)₂ | H | 4'—OCF₃ |
| CH(CO₂H)CH(CH₃)₂ | H | 3'—CH₃ |
| CH(CO₂)CH₃ | H | 4'—C₂H₅ |
| CH(CO₂H)C₃H₇ | H | 4'—SC₃H₇ |
| CH₂CO₂H | 2'—OCH₃ | 4'—SCH₃ |
| CH(CO₂H)C₄H₉ | 2'—OCH₃ | 4'—OCH₃ |
| CH(CO₂H)C₅H₁₁ | H | 4'—OC₂H₅ |
| CH(CO₂H)C₅H₁₁ | H | 4'—Cl |

EXAMPLE XXXIII

Employing the oxidation procedure from Example X and using equivalent amounts of the requisite starting materials the following products are prepared:

| X | R₁ | n | R₂ |
|---|---|---|---|
| —SO₂NH₂ | CH₂CO₂K | 1 | CH₃ |
| —SO₂NH₂ | CH(CO₂H)CH₃ | 2 | C₂H₅ |
| —SO₂NH₂ | CH(CO₂H)C₄H₇ | 1 | CH₃ |
| —SO₂NH₂ | CH(CO₂H)C₄H₇ | 2 | CH₃ |
| —SO₂NH₂ | CH(CO₂H)C₅H₁₁ | 1 | C₄H₇ |
| —SO₂NHCH₃ | CH₂CO₂H | 2 | CH₃ |
| —SO₂NHCH₃ | CH(CO₂H)C₂H₅ | 1 | C₂H₅ |
| —SO₂NHCH₃ | CH(CO₂H)C₂H₅ | 2 | C₂H₅ |
| —SO₂NHCH₃ | CH(CO₂H)C₅H₁₁ | 2 | C₄H₇ |
| —SO₂NHCH₃ | CH(CO₂H)CH₃ | 1 | C₅H₁₁ |
| —SO₂NHCH₃ | CH(CO₂H)CH₃ | 2 | C₅H₁₁ |
| —SO₂NHCH₃ | CH₂CO₂H | 1 | CH₃ |
| —SO₂N(CH₃)₂ | CH₂CO₂H | 2 | CH₃ |
| —SO₂N(CH₃)₂ | CH(CO₂H)C₃H₇ | 1 | C₂H₅ |
| —SO₂N(CH₃)₂ | CH(CO₂H)C₃H₇ | 2 | C₂H₅ |
| —SO₂N(CH₃)₂ | CH(CO₂H)C₂H₅ | 1 | C₂H₅ |
| —SO₂N(CH₃)₂ | CH(CO₂H)C₂H₅ | 2 | C₂H₅ |
| —SO₂N(CH₃)₂ | CH(CO₂H)C₄H₉ | 1 | C₅H₁₁ |
| —SO₂N(CH₃)₂ | CH(CO₂H)C₄H₇ | 2 | C₅H₁₁ |

EXAMPLE XXXIV 2-(N-methylcarboxamidomethyl)-3-methylthioquinoxaline-di-N-oxide

To a chloroform solution of 2.66 g. (0.01 mole) of 2-carboxymethyl-3-methylthioquinoxaline-di-N-oxide and 1.08 g. (0.01 mole) of ethyl chloroformate cooled to 0° C. is slowly added, dropwise, 1.01 g. (0.01 mole) of triethyl amine. The resulting mixture is allowed to stir at 0° C. for 20 min. after which a chloroform solution containing 600 mg. (0.02 mole) of methylamine is added slowly. The reaction is allowed to warm to room temperature and remain at ambient temperature overnight. The mixture is extracted several times with water and the organic phase is separated and dried over sodium sulfate. Removal of the chloroform under reduced pressure provides the crude product. The product is purified by recrystallization from methanol.

EXAMPLE XXXV

The procedure of Example XXXIV is repeated, using the appropriate starting materials, to provide the following products:

| R₁ | R₂ |
|---|---|
| CH₂CONHCH₃ | C₂H₅ |
| CH₂CONHC₂H₅ | C₂H₅ |
| CH₂CONHC₂H₅ | CH₃ |
| CH₂CONHCH₃ | n-C₃H₇ |
| CH₂CONHC₃H₇ | CH₃ |
| CH₂CON(CH₃)₂ | CH₃ |
| CH₂CON(CH₃)C₃H₇ | C₂H₅ |
| CH₂CON(CH₃)₂ | n-C₅H₁₁ |
| CH₂CONH₂ | CH₃ |
| CH₂CONH₂ | iso-C₃H₇ |
| CH₂CONH₂ | sec-C₄H₉ |
| CH(CONHC₂H₅)CH₃ | CH₃ |
| CH(CONHC₃H₇)C₂H₅ | C₂H₅ |
| CH(CONHC₄H₉)C₄H₉ | n-C₆H₁₁ |
| CH[CON(CH₃)₂]CH₃ | iso-C₄H₉ |
| CH[CON(CH₃)₂]C₃H₇ | CH₃ |
| CH[CON(C₄H₉)₂]CH₃ | tert-C₄H₉ |
| CH[CON(C₃H₇)₂]C₅H₁₁ | CH₃ |

EXAMPLE XXXVI

The procedures of Example X are again repeated, using the appropriate starting materials, to provide the following compounds:

2-(N - methylcarboxamidomethyl) - 3-methylsulfinyl quinoxaline-di-N-oxide.

2-(N,N-dimethylcarboxamidomethyl) - 3-methylsulfinyl-6- and 7-chloroquinoxaline-di-N-oxide.

2-(α-N-methylcarboxamidoethyl) - 3 - methylsulfonyl-6- and 7-methoxyquinoxaline-di-N-oxide.

2-(α-N-n-propylcarboxamido-2-propyl) - 3 - n-butylsulfonylquinoxaline-di-N-oxide.

2-(α-N,N-diethylcarboxamido-2-pentyl) - 3 - (2,3-dimethylbutylsulfinyl)quinoxaline-di-N-oxide.

2-(N-methylcarboxamidomethyl)-3 - methylsulfonyl-quinoxaline-di-N-oxide.

2-(N-methylcarboxamidomethyl) - 3 - methylsulfonyl-quinoxaline-di-N-oxide.

2-(N-ethylcarboxamidomethyl) - 3 - methylsulfinyl-6- and 7-trifluoromethylquinoxaline-di-N-oxide.

2-(N-ethylcarboxamidomethyl) - 3 - methylsulfinyl-6- and 7-(N-methylsulfamyl)quinoxaline-di-N-oxide.

2-(α-N,N-dimethylcarboxamidoethyl) - 3 - ethylsulfonyl-6- and 7-carboxyquinoxaline-di-N-oxide.

EXAMPLE XXXVII 2-(α-carbethoxyethyl)-3-phenylthioquinoxaline-di-N-oxide

A solution of 3.42 g. (0.01 mole) of 2-(α-carboxyethyl) 3-phenylthioquinoxaline-di-N-oxide in ethanol is treated with gaseous hydrogen chloride gas introduced slowly below the surface of the solvent. After the solution is saturated with the hydrogen chloride the gas source is removed and the reaction mixture is heated to reflux for 30–60 min. The excess gas and solvent are removed on a water pump and the residual product is recrystallized from ethyl acetate-ethanol.

EXAMPLE XXXVIII

The procedure of Example XXXVII is repeated, using equivalent amounts of the requisite starting materials, to provide the following analogs:

| X | R₁ | R₂ |
|---|----|----|
| OCH₃ | CH₂CO₂C₂H₅ | Cyclopropyl. |
| OCH₃ | CH₂CO₂C₂H₅ | Cyclopentyl. |
| OCH₃ | CH₂CO₂C₂H₅ | Cyclohexyl. |
| OCH₃ | CH(CO₂C₃H₇)C₂H₅ | Do. |
| OCH₃ | CH(CO₂C₃H₇)C₂H₅ | Cyclobutyl. |
| OCH₃ | CH(CO₂C₃H₇)C₂H₅ | Cyclopentyl. |
| OCH₃ | CH(CO₂CH₃)C₅H₁₁ | Cyclohexyl. |
| CH₃ | CH(CO₂CH₃)CH₃ | Cyclopropyl. |
| CH₃ | CH(CO₂CH₃)CH₃ | Cyclopentyl. |
| CH₃ | CH(CO₂CH₃)CH₃ | Cyclohexyl. |
| CH₃ | CH₂CO₂C₄H₉ | Do. |
| CH₃ | CH₂CO₂C₄H₉ | Cyclobutyl. |
| CH₃ | CH(CO₂C₂H₅)C₅H₁₁ | Cyclohexyl. |
| CH₃ | CH(CO₂C₂H₅)C₅H₁₁ | Cyclopropyl. |
| CF₃ | CH₂CO₂CH₃ | Do. |
| CF₃ | CH₂CO₂CH₃ | Cyclohexyl. |
| CF₃ | CH₂CO₂CH₃ | Cyclobutyl. |
| CF₃ | C(CH₃)₂(CHCO₂CH₃) | Do. |
| CF₃ | C(CH₃)₂(CHCO₂CH₃) | Cyclohexyl. |
| CF₃ | CH(CO₂C₄H₉)C₂H₅ | Do. |
| CF₃ | CH(CO₂C₄H₉)C₂H₅ | Cyclopentyl. |

EXAMPLE XXXIX

The oxidation procedures of Example X are again repeated, using the appropriate starting materials, to provide the following congeners:

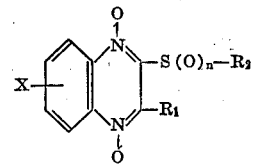

| X | R₁ | n | R₂ |
|---|----|----|----|
| Cl | CH(CH₃)CO₂CH₃ | 1 | Cyclohexyl. |
| Cl | CH(CH₃)CO₂CH₃ | 2 | Do. |
| Cl | CH(CO₂C₂H₅)C₂H₅ | 1 | Do. |
| Cl | CH(CO₂C₂H₅)C₂H₅ | 2 | Do. |
| Cl | CH(CO₂C₄H₉)CH₃ | 2 | Cyclopentyl. |
| Cl | CH(CO₂CH₃)C₅H₁₁ | 2 | Cyclohexyl. |
| F | CH₂CO₂CH₃ | 1 | Cyclopropyl. |
| F | C(CH₃)₂CO₂CH₃ | 1 | Cyclopentyl. |
| F | C(CH₃)₂CO₂CH₃ | 2 | Do. |
| F | CH(CO₂C₃H₇)C₅H₁₁ | 2 | Cyclopropyl. |
| F | CH(CO₂C₃H₇)C₅H₁₁ | 2 | Cyclohexyl. |
| F | CH(CO₂CH₃)C₄H₇ | 2 | Do. |
| F | CH(CO₂CH₃)C₅H₁₁ | 2 | Do. |

EXAMPLE XL 2-formyl-3-methylsulfonylquinoxaline-di-N-oxide

To a solution containing 2.70 g. (0.01 mole) of 2-hydroxymethyl-3-methylsulfonylquinoxaline-di-N-oxide and 1.47 g. (0.015 mole) of phosphoric acid in 75 ml. of dry dimethylsulfoxide is added 6.18 g. (0.03 mole) of dicyclohexylcarbodiimide. The reaction mixture is allowed to stir at room temperature overnight, and is then poured into a mixture of ice and water. The mixture of product and dicyclohexylurea is filtered with suction, and the product is extracted from the urea using chloroform. The solvent is concentrated in volume and cooled. The desired product, after filtering and drying, is further purified by recrystallization from methanol.

EXAMPLE XLI

The procedure of Example XL is repeated, using equivalent amounts of the requisite α-hydroxyalkylquinoxaline-di-N-oxide, to provide the following compounds:

| R₁ | n | R₂ |
|----|----|----|
| CHO | 0 | CH₃ |
| CHO | 1 | CH₃ |
| COCH₃ | 0 | CH₃ |
| COCH₃ | 1 | CH₃ |
| COCH₃ | 2 | CH₃ |
| COC₂H₅ | 0 | CH₃ |
| COC₂H₅ | 2 | CH₃ |
| CHO | 0 | C₂H₅ |
| CHO | 0 | n-C₃H₇ |
| CHO | 2 | n-C₃H₇ |
| CHO | 2 | n-C₄H₉ |
| CHO | 1 | i-C₃H₇ |
| CO(CH₂)₂CH₃ | 0 | sec-C₄H₉ |
| CO(CH₂)₂CH₃ | 1 | sec-C₄H₉ |
| CO(CH₂)₂CH₃ | 2 | sec-C₄H₉ |
| CO(CH₂)₂CH₃ | 2 | n-C₃H₇ |
| CO(CH₂)₂CH₃ | 2 | t-C₄H₉ |
| COCH(CH₃)₂ | 0 | CH₃ |
| COCH(CH₃)₂ | 1 | CH₃ |
| COCH(CH₃)₂ | 2 | CH₃ |
| COCH(CH₃)₂ | 0 | C₂H₅ |
| COCH(CH₃)₂ | 2 | n-C₆H₁₃ |
| COCH(CH₃)₂ | 2 | n-C₅H₁₁ |

EXAMPLE XLII

The oxidation procedures of Example X are repeated, using equivalent amounts of the appropriate starting materials, to provide the following compounds:

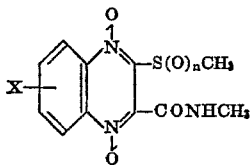

| X: | n |
|---|---|
| H | 1 |
| H | 2 |
| Cl | 1 |
| F | 1 |
| F | 2 |
| $OCH_3$ | 1 |
| $OCH_3$ | 2 |
| $SO_2NH_2$ | 2 |
| $SO_2NH(CH_3)$ | 1 |
| $SO_2NH(CH_3)$ | 2 |
| $SO_2N(CH_3)_2$ | 1 |
| $CF_3$ | 1 |
| $CF_3$ | 2 |
| $CO_2H$ | 1 |
| $CO_2CH_3$ | 2 |
| $CO_2C_3H_7$ | 2 |
| $CONHC_2H_5$ | 1 |
| $CONHC_2H_5$ | 2 |
| $CON(CH_3)_2$ | 2 |
| $CH_3$ | 1 |
| $CH_3$ | 2 |

EXAMPLE XLIII 2-methyl-3-chloroquinoxaline-di-N-oxide

To 10 ml. of 12 N hydrochloric acid solution is added 2.1 g. (0.01 mole) of 2 - methyl - 3 - methylsulfinyl-quinoxaline-di-N-oxide and the mixture heated at steam bath temperatures. The resulting solution is maintained at this temperature for 5 min., after which it is cooled and diluted with 50 ml. of water. The resulting precipitate is extracted with chloroform and the chloroform layer dried over sodium sulfate. Removal of the solvent under reduced pressure followed by recrystallization of the residual solid from methanol provides the pure product, M.P. 168–169° C.

*Analysis.*—Calcd. for $C_9H_7ClO_2N_2$ (percent): C, 51.92; H, 3.85; N, 13.46. Found (percent): C, 51.32; H, 3.35; N, 13.38.

In like manner, 2 - methyl - 3 - methylsulfonylquinoxaline-di-N-oxide affords substantially the same results when used in place of 2-methyl-3-methylsulfinylquinoxaline-di-N-oxide.

EXAMPLE XLIV 2-methyl-3-bromoquinoxaline-di-N-oxide

To 1 ml. of 48% aqueous hydrobromic acid solution is added 38 mg. (0.15 mmole) of 2-methyl-3-methylsulfonyl-quinoxaline-di-N-oxide. The mixture is then heated on a steam bath until the solids dissolve. Water (2–3 ml.) is added and the solution is cooled in an ice bath. The resulting crystalline precipitate is filtered and dried. Further purification is carried out by recrystallization from methanol.

EXAMPLE XLV 2-methyl-3-fluoroquinoxaline-di-N-oxide

To a round bottom flask coated with polyethylene and containing 5 ml. of liquid hydrogen fluoride is added 508 mg. (2 mmole) of 2 - methyl - 3 - methylsulfonylquinoxaline-di-N-oxide. The mixture is warmed to 50° C. for several minutes and added to 10 ml. of ice and water. The resulting precipitate is filtered, washed several times with water and dried. Several recrystallizations from methanol provide the pure product.

In a similar manner, replacement of 2-methyl-3-methylsulfonylquinoxaline-di-N-oxide with 2 - methyl - 3-methylsulfinylquinoxaline-di-N-oxide provides substantially the same results.

EXAMPLE XLVI

The procedures of Examples XLIII and XLIV are repeated, using the appropriate sulfoxide or sulfone and employing either hydrochloric or hydrobromic acid, to prepare the following products:

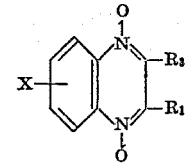

| X | $R_1$ | $R_3$ |
|---|---|---|
| H | $n-C_6H_{13}$ | Cl |
| H | $C_2H_5$ | Cl |
| H | $n-C_3H_7$ | Cl |
| H | $iso-C_3H_7$ | Cl |
| H | $t-C_4H_9$ | Cl |
| H | $n-C_5H_{11}$ | Cl |
| H | $sec-C_4H_9$ | Cl |
| H | $n-C_4H_9$ | Cl |
| Cl | $C_2H_5$ | Br |
| Cl | $n-C_3H_7$ | Br |
| Cl | $iso-C_3H_7$ | Br |
| Cl | $n-C_5H_{11}$ | Br |
| Cl | $t-C_4H_9$ | Br |
| Cl | $sec-C_4H_9$ | Br |
| Cl | $n-C_6H_{13}$ | Br |

EXAMPLE XLVII

The procedure of Examples XLIII, XLIV and XLV are repeated, using the appropriately substituted sulfinyl- and sulfonylquinoxaline-di-N-oxides and employing hydrochloric, hydrobromic or hydrofluoric acid, to prepare the following compounds:

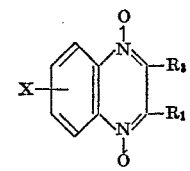

| X | $R_1$ | $R_3$ |
|---|---|---|
| H | H | Cl |
| H | $C_6H_5$ | Cl |
| H | CHO | Cl |
| H | $CH_2OH$ | Cl |
| H | $COCH_3$ | Cl |
| H | $CO(CH_2)_2CH_3$ | Cl |
| H | $CH_2Cl$ | Cl |
| H | $CH_2Br$ | Br |
| Cl | $CH(OH)C_2H_5$ | Br |
| Cl | $CH_2OH$ | Br |
| Cl | $CH(OCOCH_3)C_4H_9$ | Br |
| Cl | $CH(CN)C_2H_5$ | Br |
| Cl | $CH(CN)C_2H_5$ | Cl |
| Cl | $CONHCH_3$ | Cl |
| Cl | $CH_2OH$ | Cl |
| Cl | $CONHC_2H_5$ | Cl |
| F | $CONHC_2H_5$ | Cl |
| F | $CONHC_2H_5$ | F |
| F | $CH_2OH$ | F |
| F | $CON(CH_3)_2$ | F |
| $CO_2H$ | $CON(CH_3)(C_4H_9)$ | F |
| $CO_2CH_3$ | $CON(CH_3)(C_4H_9)$ | F |
| Cl | $CF_3$ | Cl |
| $CO_2C_4H_9$ | $CO_2C_2H_5$ | Cl |
| $CO_2C_4H_9$ | $CO_2C_2H_5$ | Br |
| $CO_2C_4H_9$ | $CONH_2$ | Cl |
| H | $CONH_2$ | Cl |
| H | $CH_2CONHCH_3$ | Cl |
| Cl | $CH_2CON(CH_3)_2$ | Cl |
| Cl | $CH(CONHCH_3)C_3H_7$ | F |
| Cl | $CH(CO_2C_2H_5)CH(CH_3)_2$ | F |
| $SO_2NH_2$ | $COC_2H_5$ | F |
| $SO_2NH_2$ | $C_5H_6$ | F |
| $SO_2NH_2$ | $CH_2OH$ | F |
| $SO_2NH_2$ | H | F |
| $SO_2NHCH_3$ | $CH_2SCH_3$ | Cl |
| $SO_2NHCH_3$ | $CH(SC_3H_7)C_2H_5$ | Cl |
| $SO_2NHCH_3$ | CHO | Cl |
| $SO_2NHCH_3$ | $CH_2OH$ | Cl |

TABLE—Continued

| X | R₁ | R₃ |
|---|---|---|
| SO₂NHCH₃ | CH₂SO₂C₄H₉ | Cl |
| SO₂N(CH₃)₂ | CH[SO₂CH(CH₃)₂]C₂H₅ | Br |
| SO₂N(CH₃)₂ | H | Br |
| SO₂N(CH₃)₂ | CF₃ | Br |
| SO₂N(CH₃)₂ | CH₂OH | Br |
| SO₂N(CH₃)₂ | CH₂CN | Br |
| SO₂N(CH₃)₂ | CH(CN)C₅H₁₁ | Br |
| H | CF₃ | Br |
| OCH₃ | CF₃ | Br |
| O₂NHCH₃ | CF₃ | Cl |
| OCH₃ | CH₂Cl | Cl |
| OCH₃ | CH₂OH | Cl |
| OCH₃ | CH₂OCOCH₃ | Cl |
| OCH₃ | H | F |
| OCH₃ | CH(SCH₃)C₂H₅ | F |
| CF₃ | CH₃ | F |
| CF₃ | CH₂OH | F |
| CF₃ | CH₂Br | F |
| CF₃ | CH(OCHOC₃)C₂H₅ | F |
| CF₃ | CH(SO₂CH₃)CH₃ | Cl |
| CF₃ | CH(SO₂CH₃)CH₃ | F |
| CH₃ | H | F |
| CH₃ | CH₃ | F |
| CH₃ | C₆H₅ | F |
| CH₃ | C₆H₆ | Br |
| CH₃ | CONHCH₃ | Br |
| CH₃ | CH(OH)C₅H₁₁ | Br |
| CH₃ | CH₂OH | Br |

EXAMPLE XLVIII

Using the procedure of Example XLIII, the following starting materials are employed to provide the final product, 2-methyl-3-chloroquinoxaline-di-N-oxide:

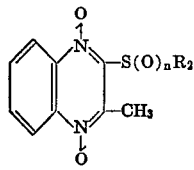

R₂:                                                  n

- Ethyl — 1
- Ethyl — 2
- n-Propyl — 1
- i-Propyl — 2
- n-Hexyl — 1
- Cyclopropyl — 1
- Cyclopropyl — 2
- Cyclohexyl — 2
- Cyclopentyl — 1
- Phenyl — 2
- p-Nitrophenyl — 1
- p-Nitrophenyl — 2
- p-trifluorophenyl — 2
- 2,6-dichlorophenyl — 2
- m-Bromobenzyl — 1
- p-Methylthiobenzyl — 2

EXAMPLE XLIX

Employing the procedure of Example XLIV the following starting materials are used to provide the final product, 2-methyl-3-bromoquinoxaline-di-N-oxide:

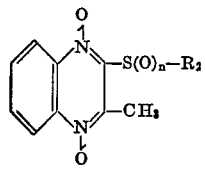

R₂:                                                  n

- Ethyl — 1
- Ethyl — 2
- n-Propyl — 2
- i-Propyl — 2
- t-Butyl — 1
- t-Butyl — 2
- Cyclopropyl — 1
- Cyclohexyl — 1
- n-Hexyl — 2
- Cyclopentyl — 1
- Cyclopentyl — 2
- Benzyl — 1
- Benzyl — 2
- 2,4-difluorophenyl — 1
- p-Nitrophenyl — 2
- p-Trifluoromethoxyphenyl — 2
- p-Ethoxyphenyl — 1

EXAMPLE L

The 2-(α-carboxyalkyl)quinoxaline-di-N-oxides of Examples XXXII and XXXIII are converted to their sodium and potassium salts by careful neutralization in methanol solution with a dilute ethanol solution of sodium or potassium ethoxide. The salts are recovered by filtration or evaporation of the solvent.

What is claimed is:

1. A compound having the formula

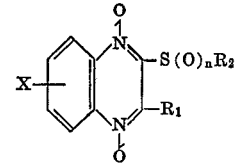

wherein X is a substituent at the 6- or 7-position selected from the group consisting of hydrogen, fluorine, chlorine, methyl, methoxy, trifluoromethyl, sulfonamido, N-methylsulfonamido and N,N-dimethylsulfonamido; R₁ is selected from the group consisting of hydrogen, alkyl and α-substituted alkyl containing up to 6 carbon atoms wherein said α-substituent is selected from the group consisting of chlorine, bromine, hydroxy, acetoxy and alkylthio, alkylsulfinyl and alkylsulfonyl containing up to 4 carbon atoms in said alkyl moieties, phenyl, carboxaldehyde and alkanoyl containing up to 4 carbon atoms; R₂ is selected from the group consisting of alkyl containing up to 6 carbon atoms, cycloalkyl of from 3 to 6 carbon atoms, phenyl, benzyl and mono- and di-substituted phenyl and benzyl, said substituents being selected from the group consisting of fluorine, chlorine, bromine, trifluoromethyl, nitro, trifluoromethoxy and alkyl, alkoxy and alkylthio, each containing up to 3 carbon atoms and n is an integer of from 0 to 2.

2. A compound having the formula

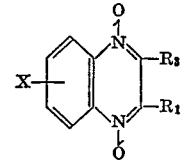

wherein X is a substituent at the 6- or 7-position selected from the group consisting of hydrogen, fluorine, chlorine, methyl, methoxy, trifluoromethyl, sulfonamido, N-methylsulfonamido and N,N-dimethylsulfonamido; R₁ is selected from the group consisting of α-substituted alkyl containing up to 6 carbon atoms wherein said α-substituent is selected from the group consisting of chlorine, bromine, hydroxy, acetoxy and alkylthio, alkylsulfinyl and alkylsulfonyl containing up to 4 carbon atoms in said alkyl moieties, phenyl, carboxaldehyde and alkanoyl containing up to 4 carbon atoms and R₃ is selected from the group consisting of fluorine, chlorine and bromine.

3. The compounds of the formula of claim 1, wherein X is hydrogen, R₁ is methyl and R₂ is alkyl containing up to 6 carbon atoms.

4. 2-methyl-3-methylsulfinylquinoxaline-di-N-oxide, a compound according to claim 3 wherein R₂ is methyl and n is an integer of 1.

5. 2-methyl-3-methylsulfonylquinoxaline-di-N-oxide, a compound according to claim 3 wherein R₂ is methyl and n is an integer of 2.

6. The compounds of the formula of claim 1, wherein X is hydrogen, $R_1$ is hydroxymethyl and $R_2$ is alkyl containing up to 6 carbon atoms.

7. 2 - hydroxymethyl - 3 - methylsulfinylquinoxaline-di-N-oxide, a compound according to claim 6 wherein $R_2$ is methyl and $n$ is an integer of 1.

8. 2-hydroxymethyl - 3 - methylsulfonylquinoxaline-di-N-oxide, a compound according to claim 6 wherein $R_2$ is methyl and $n$ is an integer of 2.

9. The compounds of the formula of claim 2, wherein $R_1$ is hydroxymethyl and $R_3$ is selected from the group consisting of chlorine and bromine.

10. A process for preparing quinoxaline-di-N-oxides of the formula:

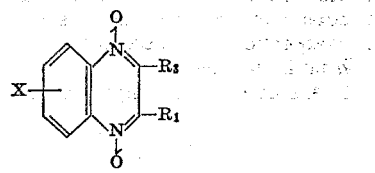

which comprises reaction of a compound of the formula:

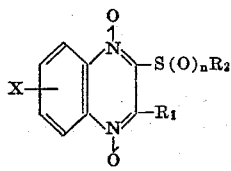

with a hydrogen halide of the formula HA wherein A is an ionion selected from the group consisting of fluoride, chloride and bromide;

X is a substituent at the 6- or 7-position selected from the group consisting of:
(1) hydrogen,
(2) fluorine and chlorine,
(3) methyl, methoxy and trifluoromethyl,
(4) carboxy, carboalkoxy containing up to 4 carbon atoms and carboxamido of the formula

—$CONR_4R_5$ wherein the substituents $R_4$ and $R_5$ are each selected from the group consisting of hydrogen and alkyl containing up to 4 carbon atoms,
(5) sulfonamido, N-methylsulfonamido and N,N-dimethylsulfonamido;

$R_1$ is selected from the group consisting of:
(1) hydrogen,
(2) alkyl and α-substituted alkyl containing up to 6 carbon atoms, wherein said α substituent is selected from the group consisting of chlorine, bromine and alkylthio, and alkylsulfonyl, said alkyl containing up to 4 carbon atoms,
(3) phenyl,
(4) carboxaldehyde,
(5) carboalkoxy of from 2 to 4 carbon atoms and carboxamido of the formula $CONR_4R_5$, wherein the substituents $R_4$ and $R_5$ are each selected from the group consisting of hydrogen and alkyl containing up to 4 carbon atoms,
(6) alkanoyl containing up to 4 carbon atoms,
(7) trifluoromethyl;

$R_2$ is selected from the group consisting of:
(1) alkyl containing up to 6 carbon atoms,
(2) cycloalkyl of from 3 to 6 carbon atoms,
(3) phenyl, benzyl and mono- and disubstituted phenyl and benzyl, said substituent being selected from the group consisting of fluorine, chlorine, bromine, alkyl, alkoxy and alkylthio each containing up to 3 carbon atoms, trifluoromethyl, nitro and trifluoromethoxy; and $R_3$ is selected from the group consisting of fluorine, chlorine and bromine; and $n$ is an integer of 1 or 2, in a reaction-inert solvent at a temperature of from about 25–110° C.

11. A process as claimed in claim 10 wherein HA is hydrochloric acid.

12. A process as claimed in claim 10 wherein HA is hydrobromic acid.

13. A process as claimed in claim 10 wherein the reaction-inert solvent is water.

14. A process as claimed in claim 10 wherein X is hydrogen, $R_1$ is methyl and $n$ is 1.

15. A process as claimed in claim 10 wherein X is hydrogen, $R_1$ is methyl and $n$ is 2.

16. A process as claimed in claim 10 wherein the temperature is from 50–90° C.

References Cited
UNITED STATES PATENTS

| | | | |
|---|---|---|---|
| 2,644,000 | 6/1953 | Landquist | 260—250 R |
| 3,555,025 | 1/1971 | Ley et al. | 260—250 R |
| 3,598,819 | 8/1971 | Stapley et al. | 260—250 R |

FOREIGN PATENTS

| | | | |
|---|---|---|---|
| 6,504,563 | 10/1965 | Netherlands | 260—250 |

NICHOLAS S. RIZZO, Primary Examiner

U.S. Cl. X.R.

424—250